United States Patent
Gibbs et al.

(10) Patent No.: US 10,684,467 B2
(45) Date of Patent: Jun. 16, 2020

(54) IMAGE PROCESSING FOR HEAD MOUNTED DISPLAY DEVICES

(71) Applicant: Samsung Electronics Co., Ltd., Suwon-si, Gyeonggi-do (KR)

(72) Inventors: Simon J. Gibbs, San Jose, CA (US); Anthony S. Liot, Cupertino, CA (US); Yu Song, Pleasanton, CA (US); Yoshiya Hirase, Santa Clara, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/877,934

(22) Filed: Jan. 23, 2018

(65) Prior Publication Data

US 2018/0149864 A1 May 31, 2018

Related U.S. Application Data

(63) Continuation of application No. 14/801,574, filed on Jul. 16, 2015, now Pat. No. 9,910,275.
(Continued)

(51) Int. Cl.
*G02B 27/00* (2006.01)
*A63F 13/00* (2014.01)
(Continued)

(52) U.S. Cl.
CPC .......... *G02B 27/0093* (2013.01); *A63F 13/00* (2013.01); *A63F 13/212* (2014.09);
(Continued)

(58) Field of Classification Search
CPC .............. G02B 27/017; G02B 27/0172; G02B 2027/0178; G02B 2027/014;
(Continued)

(56) References Cited

U.S. PATENT DOCUMENTS 6,545,685 B1  4/2003  Dorbie
7,127,081 B1  10/2006  Erdem
(Continued)

FOREIGN PATENT DOCUMENTS

CN  1391126 A  1/2003
CN  103996020 A  8/2014
(Continued)

OTHER PUBLICATIONS

Cao et al., "Displaced Dynamic Expression Regression for Real-time Facial Tracking and Animation", AMC Transactions on Graphics (SIGGRAPH), 2014.
(Continued)

*Primary Examiner* — Koosha Sharifi-Tafreshi

(57) ABSTRACT

Various devices, arrangements and methods for managing communications using a head mounted display device are described. In one aspect, tracking data is generated at least in part by one or more sensors in a head mounted display (HMD) device. The tracking data indicates one or more facial movements of a user wearing the HMD device. A patch image is obtained based on the tracking data. The patch image is merged with a facial image. Various embodiments relate to the HMD device and other methods for generating and using the patch and facial images.

18 Claims, 14 Drawing Sheets

Related U.S. Application Data

(60) Provisional application No. 62/163,321, filed on May 18, 2015.

(51) Int. Cl.

| | | |
|---|---|---|
| *G06F 3/01* | (2006.01) | |
| *G06F 3/03* | (2006.01) | |
| *G06K 9/00* | (2006.01) | |
| *A63F 13/213* | (2014.01) | |
| *A63F 13/212* | (2014.01) | |
| *A63F 13/57* | (2014.01) | |
| *G02B 27/01* | (2006.01) | |
| *G06T 11/60* | (2006.01) | |
| *G06T 17/00* | (2006.01) | |
| *H04N 7/14* | (2006.01) | |

(52) U.S. Cl.
CPC ............ *A63F 13/213* (2014.09); *A63F 13/57* (2014.09); *G02B 27/017* (2013.01); *G06F 3/012* (2013.01); *G06F 3/013* (2013.01); *G06F 3/015* (2013.01); *G06F 3/0304* (2013.01); *G06K 9/00221* (2013.01); *G06K 9/00268* (2013.01); *G06K 9/00671* (2013.01); *G06T 11/60* (2013.01); *G06T 17/00* (2013.01); *G02B 2027/014* (2013.01); *G02B 2027/0138* (2013.01); *G02B 2027/0141* (2013.01); *G02B 2027/0143* (2013.01); *G02B 2027/0187* (2013.01); *H04N 7/142* (2013.01)

(58) Field of Classification Search
CPC .... G02B 2027/0187; G02B 2027/0138; G02B 27/0093; G02B 27/0176; G06K 9/00302; G06F 3/011; G06F 3/013
See application file for complete search history.

(56) References Cited

U.S. PATENT DOCUMENTS

| | | | |
|---|---|---|---|
| 7,168,953 B1 | 1/2007 | Poggio | |
| 7,324,110 B2 | 1/2008 | Edwards et al. | |
| 7,804,997 B2 | 9/2010 | Geng | |
| 8,218,825 B2 | 7/2012 | Gordon et al. | |
| 8,330,823 B2 | 12/2012 | Gordon | |
| 8,472,120 B2 | 6/2013 | Border et al. | |
| 8,687,880 B2 | 4/2014 | Wei et al. | |
| 8,885,882 B1 | 11/2014 | Yin et al. | |
| 8,970,569 B2 | 3/2015 | Vilcovsky et al. | |
| 2002/0012454 A1* | 1/2002 | Liu | G06K 9/00201 382/118 |
| 2002/0015527 A1* | 2/2002 | Nambu | G06K 9/00221 382/218 |
| 2002/0080094 A1* | 6/2002 | Biocca | A41D 31/0088 345/8 |
| 2002/0196554 A1 | 12/2002 | Cobb et al. | |
| 2003/0107586 A1 | 6/2003 | Takiguchi | |
| 2006/0071934 A1 | 4/2006 | Sagar | |
| 2010/0328307 A1* | 12/2010 | Lim | G06K 9/00221 345/420 |
| 2011/0263946 A1 | 10/2011 | el Kaliouby et al. | |
| 2012/0154557 A1 | 6/2012 | Perez et al. | |
| 2013/0093788 A1 | 4/2013 | Liu et al. | |
| 2013/0141434 A1* | 6/2013 | Sugden | G02B 27/017 345/426 |
| 2013/0177296 A1 | 7/2013 | Geisner et al. | |
| 2013/0194177 A1* | 8/2013 | Sakata | H04N 21/4223 345/156 |
| 2013/0248691 A1 | 9/2013 | Mirov | |
| 2014/0002496 A1 | 1/2014 | Lamb et al. | |
| 2014/0063054 A1 | 3/2014 | Osterhout et al. | |
| 2014/0126782 A1* | 5/2014 | Takai | G06K 9/0061 382/116 |
| 2014/0153832 A1* | 6/2014 | Kwatra | G06T 11/00 382/195 |
| 2014/0225978 A1 | 8/2014 | Saban et al. | |
| 2014/0254939 A1* | 9/2014 | Kimura | H04N 5/23219 382/201 |
| 2014/0285641 A1* | 9/2014 | Kato | G06F 3/013 348/54 |
| 2014/0347265 A1* | 11/2014 | Aimone | G09G 3/003 345/156 |
| 2014/0354684 A1 | 12/2014 | Beckwith et al. | |
| 2015/0055821 A1 | 2/2015 | Fotland | |
| 2015/0094142 A1 | 4/2015 | Stafford | |
| 2015/0243035 A1* | 8/2015 | Narasimha | G06T 19/20 382/154 |
| 2015/0310263 A1* | 10/2015 | Zhang | G06K 9/00315 382/103 |
| 2016/0109961 A1* | 4/2016 | Parshionikar | G06F 3/013 |
| 2016/0216760 A1* | 7/2016 | Trutna | G06F 3/015 |
| 2016/0217621 A1* | 7/2016 | Raghoebardajal | G06T 19/006 |
| 2016/0271002 A9* | 9/2016 | Simmons | G16H 50/30 |
| 2016/0341959 A1 | 11/2016 | Gibbs et al. | |
| 2017/0035317 A1* | 2/2017 | Jung | A61B 5/04842 |
| 2017/0178306 A1 | 6/2017 | Le Clerc | |

FOREIGN PATENT DOCUMENTS

| | | |
|---|---|---|
| JP | H11-96366 A | 4/1999 |
| JP | 2005-192925 A | 7/2005 |
| WO | 2016-020921 | 2/2016 |

OTHER PUBLICATIONS https://facerig.com/index.php?option=com_content&view=category&layout=blog&id=13&Itemid=134, Download date: Jul. 15, 2015.
http://www.faceshift.com/product/, Download date: Jul. 15, 2015.
Li et al., "Facial Performance Sensing Head-Mounted Display", Aug. 2015, ACM Transactions on Graphics, Proceedings of the 42$^{nd}$ ACM Siggraph Conference and Exhibition 2015.
Burgos-Artizzu et al., "Real-time expression-sensitive HMD face reconstruction", Nov. 2015, SA '15 Siggraph Asia 2015 Technical Briefs Article No. 9.
Gibbs et al. U.S. Appl. No. 15/874,318, filed Jan. 18, 2018.
Extended European Search Report regarding Application No. 16166258.0, dated Oct. 12, 2016, 7 pages.
The State Intellectual Property Office of People's Republic of China First Office Action regarding Application No. 201610330835.2, dated Jul. 16, 2019, 17 pages.

* cited by examiner

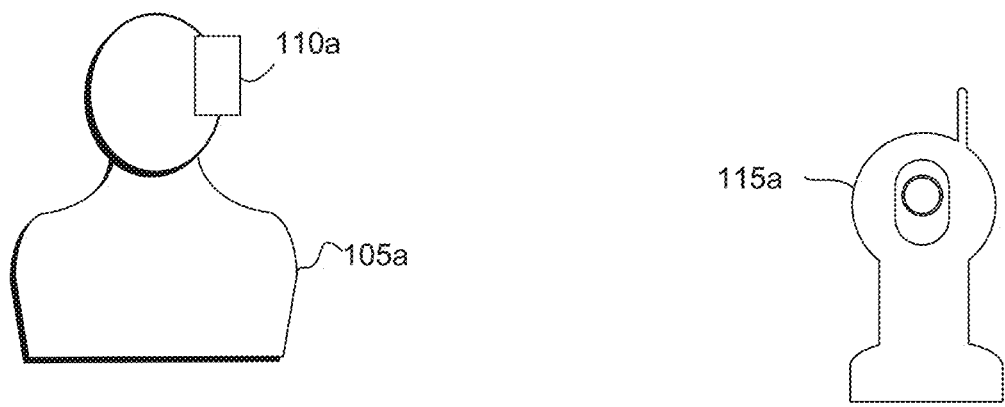
FIG. 6
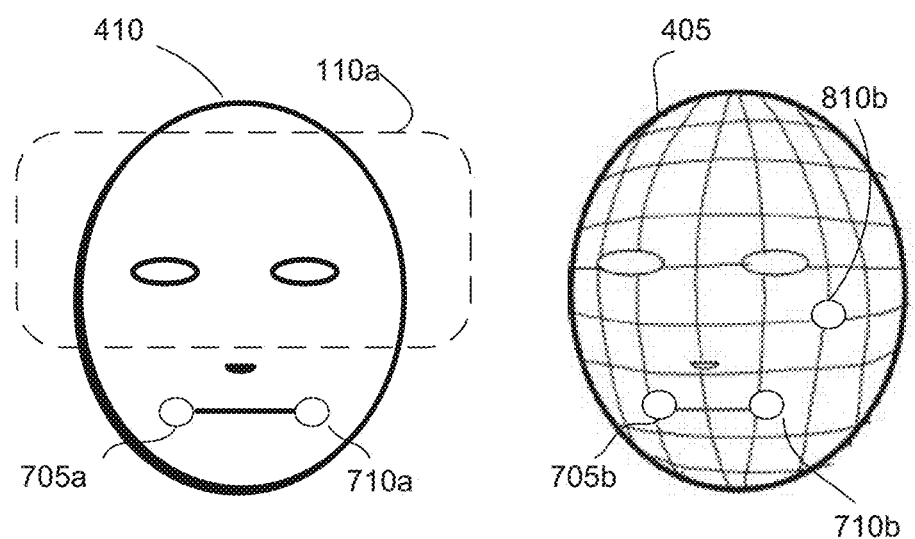
FIG. 7A  FIG. 7B

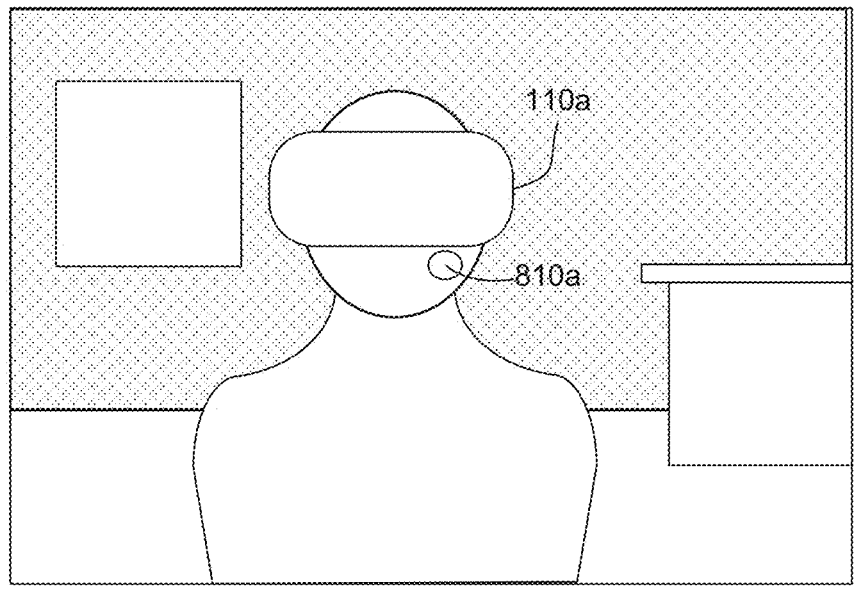
FIG. 8
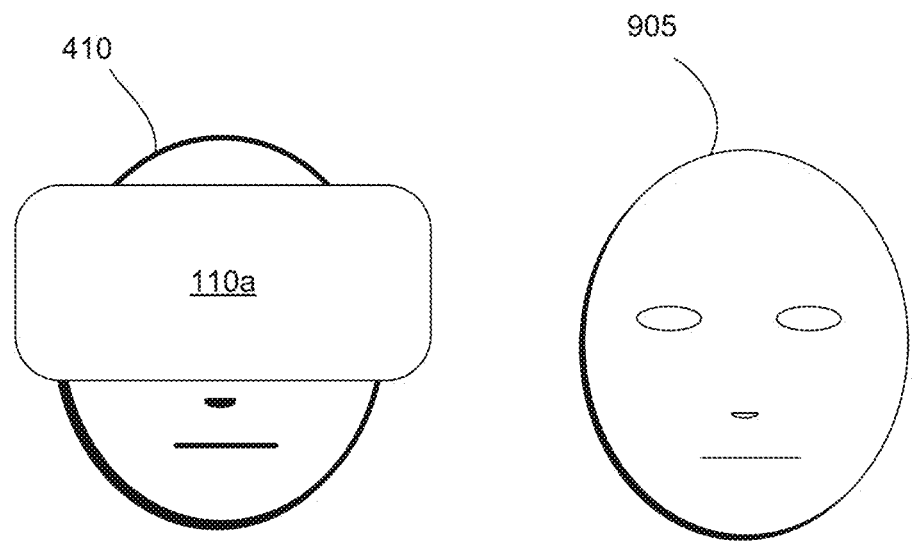
FIG. 9A  FIG. 9B

IMAGE PROCESSING FOR HEAD MOUNTED DISPLAY DEVICES

CROSS-REFERENCE TO RELATED APPLICATIONS

This application is a continuation of U.S. patent application Ser. No. 14/801,574, filed Jul. 16, 2015, entitled "IMAGE PROCESSING FOR HEAD MOUNTED DISPLAY DEVICES," which claims the priority of U.S. provisional patent application No. 62/163,321, entitled "System for Synthetically Removing Head Mounted Displays from Real-time Video Imagery," filed May 18, 2015, which are all incorporated herein in entirety for all purposes.

FIELD OF THE INVENTION

The present invention relates generally to the processing of images. Various implementations of the present invention relate to the generation and processing of images using a head mounted display device.

BACKGROUND

In the last several years, virtual reality applications have received increasing attention. Virtual reality applications involve technologies that immerse the user in a different environment. In some applications, the user wears a head mounted display (HMD) device. Examples of such devices include the Samsung Gear VR® and the Oculus Rift®. Typically, when users wear such devices, their eyes are completely covered. The HMD device includes an interior screen that displays images and animation for the user. The images give the user the impression that they have been transported into a virtual environment.

A variety of applications have been contemplated for such HMD devices. For example, HMD devices can be used for entertainment applications, such as games in which the user can explore a virtual, fantastical world, and "teleimmersion" applications where the user is transported to another real world location. There are ongoing efforts to develop additional applications for HMD devices.

SUMMARY

In one aspect of the present invention, a head mounted display (HMD) device will be described. When worn by a user, the HMD device covers a portion of the face of the user such that the eyes of the user and (large) portions of the face are hidden from view. One or more sensors are positioned on the device body. The sensor(s) are arranged to track eye movement, eyelid movement, eyebrow movement and/or other facial features of the user. A display positioned on the device body is arranged to display an image or media for the user when the HMD device is worn by the user.

In another aspect of the invention, a method for processing media for use in a communications application will be described. Tracking data is obtained. The tracking data is generated at least in part by one or more sensors in a HMD device. The tracking data indicates one or more facial movements of a user (e.g., gaze, eye rotation, eyebrow or eyelid movements, etc.) wearing the HMD device. A patch image is obtained based on the tracking data. The patch image indicates a portion of the face of the user that is covered by the HMD device. A facial image is also obtained. The facial image is generated at least in part by capturing a portion of the face of the user that is not covered by the HMD device (e.g., using a camera or any suitable recording/scanning device.) The facial image is merged with the patch image such that the merged image indicates the face of the user, which indicates features (e.g., eyes, eyebrows, etc.) on the portion of the face of the user covered by the HMD device. In various embodiments, the merged image is transmitted to another HMD device so that the facial movements of the user can be displayed in real time at that HMD device. Various implementations involve devices, systems and computer code arranged to perform at least some of the above operations.

BRIEF DESCRIPTION OF THE DRAWINGS

The invention and the advantages thereof, may best be understood by reference to the following description taken in conjunction with the accompanying drawings in which:

FIG. 6 is a diagram illustrating a camera device and a user wearing a HMD device according to a particular embodiment of the present invention.

FIG. 7A is a diagram illustrating an image of a face of a user according to a particular embodiment of the present invention.

FIG. 7B is a diagram illustrating a three dimensional model of the face of the user illustrated in FIG. 7A.

FIG. 8 is a diagram illustrating a technique for sensing light levels according to a particular embodiment of the present invention.

FIG. 9A is a diagram illustrating a live image of a user wearing an HMD device according to a particular embodiment of the present invention.

FIG. 9B is a diagram illustrating a rendered model of the face of the user illustrated in FIG. 9A.

In the drawings, like reference numerals are sometimes used to designate like structural elements. It should also be appreciated that the depictions in the figures are diagrammatic and not to scale.

DETAILED DESCRIPTION

The present invention relates to methods, devices, systems and arrangements for the processing and generation of images for head mounted display (HMD) devices. Various implementations allow one user of an HMD device to view the facial expressions of another user, even when all of the users are wearing HMD devices that cover a large portion of their faces.

As described in the Background, games are a popular application for many virtual reality and HMD device applications. One other possible application is communications e.g., virtual reality or video conferencing between users of HMD devices.

Figure 1:
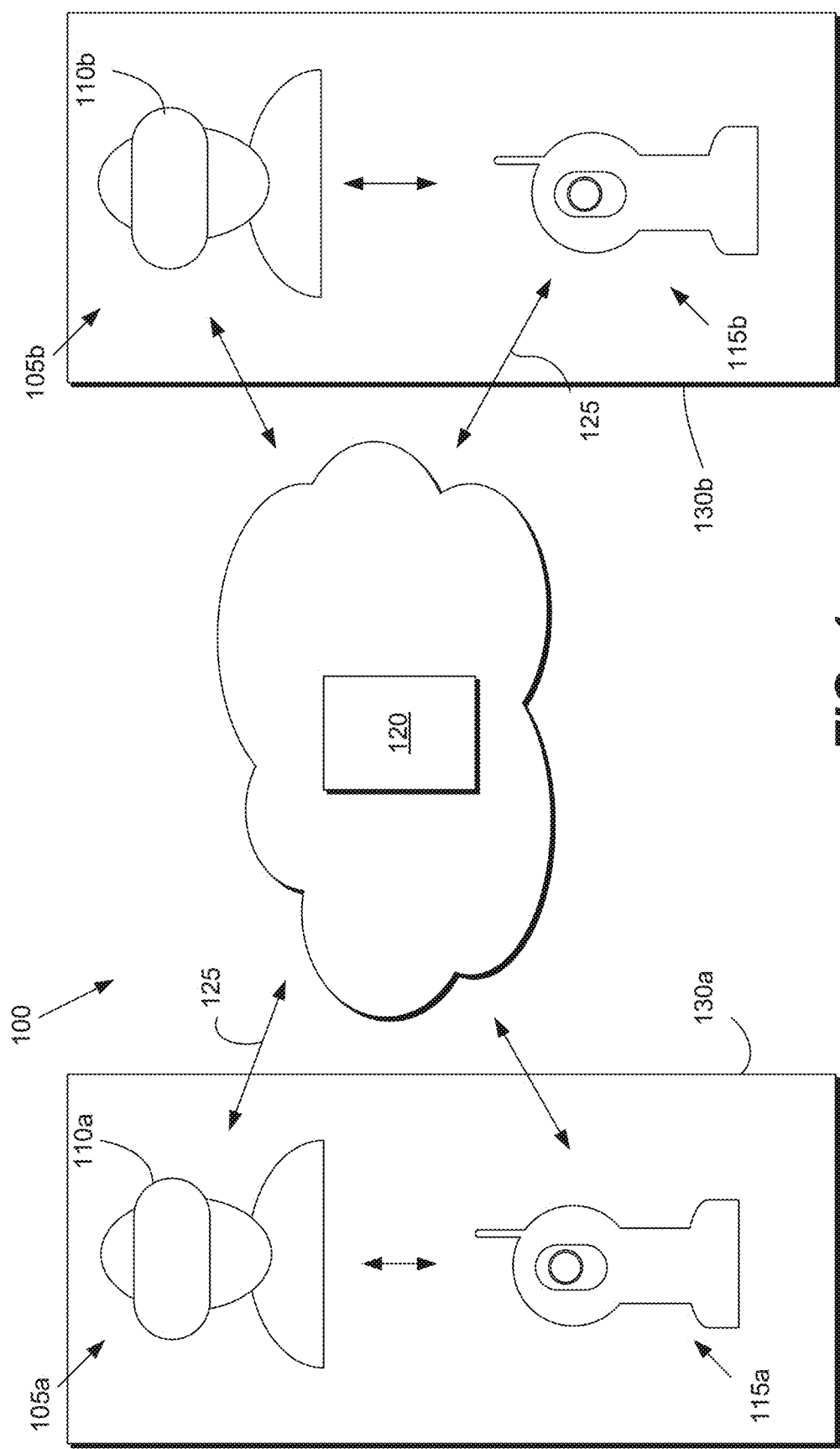
FIG. 1 is a diagram of a communication system involving a multiple head mounted display (HMD) devices according to a particular embodiment of the present invention.

An example of a system 100 for users of HMD devices is illustrated in FIG. 1. The communication system 100 includes two users, user 105a and user 105b. Each user is wearing a HMD device 110a/110b and is situated in a room (rooms 130a and 130b). In each room there is also a camera device (camera devices 115a and 115b) that is positioned a short distance away from its respective user. The HMD devices and/or camera devices are coupled with one another using a network 125. In some embodiments, there is a server 120 that helps process media and manage communications between the HMD devices.

In this example, the camera device 115a directs a camera at the face of the user 105a in room 130a. The camera device 115a is arranged to record the facial expression and movements of the user 105a, as well as possibly the background of the room 130a behind the user 105a. In some implementations, the camera device 115a captures a live video stream of the user 105a. The camera device 115a transmits the recorded video data through a network 125 (e.g., the Internet) in real time so that the other user 105b can view the video stream using the HMD device 110b. In some embodiments, the camera device 115b receives the recorded data and transmits it to the HMD device 110b for user 115b. Alternatively, in other embodiments the HMD device 110b is directly connected to the network 125 and is arranged to receive the recorded data directly from the network 125.

Based on the recorded video data, the HMD device 110b worn by user 105b then renders the video stream. Accordingly, the HMD device 110b displays the face and movements of the other user 105a in real time.

In this example, the communication between the user 105a and 105b is two-way. That is, the camera device 115b for the user 105b records the face and movements of the user 105b and transmits associated video data to the user 105a across the network 125. Each HMD device also includes microphones that capture the speech of each user. This speech is converted into audio data that is also transmitted in real time to the other user across the network 125. Thus, the users 105a/105b are able to communicate with one another in real time, while also viewing each other's faces using their HMD devices.

Figure 2A:
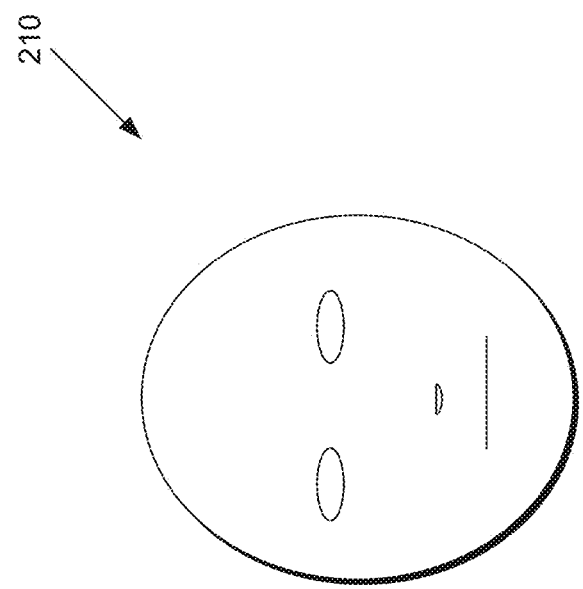
FIG. 2A is diagram of a user who is wearing an HMD device according to a particular embodiment of the present invention.
Figure 2B:
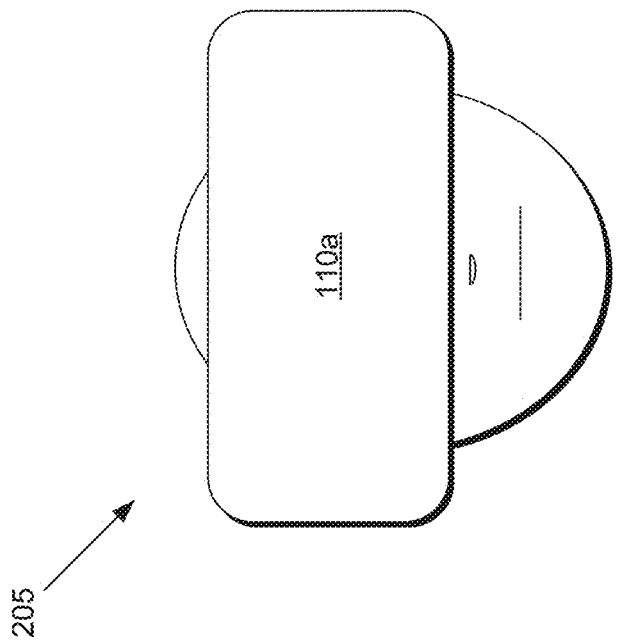
FIG. 2B is a diagram of a user without an HMD device according to a particular embodiment of the present invention.

Although the above communication system is useful, there is a problem related to the use of the HMD devices. This problem is illustrated in FIGS. 2A and 2B. FIG. 2A is a diagram illustrating the face of user 105a when the user 105a is wearing the HMD device 110a. That is, the diagram represents a view of the user 105a as seen from the perspective of the camera device 115a. Thus, the diagram also represents the view of the user 105a as seen by the other user 105b. As shown in the diagram, the HMD device 110a entirely covers the eyes and other regions on the face of the user 105a such that they are not visible to the camera device 110a or the user 105b.

For human communication and interaction, however, the ability to view a person's eyes and facial movements is valuable. Gaze, eyebrow movement and other facial movements are important elements in a conversation. They can help convey the emotion or intent of the speaker. The ability to view facial movements would help the communication illustrated in FIG. 1 to be significantly more engaging and lively. In many situations, a user of an HMD device who is participating in a video conference would prefer to see the entire face of the other conference participant, as represented by the face 210 illustrated in FIG. 2B. That is, it is generally preferred that the HMD device 110a be removed and that the eyes and facial expressions of the user be visible.

Various implementations of the present invention address this issue. In some approaches, a patch image is generated. That is, in various embodiments, the image of the user 105a wearing the HMD device 110a (e.g., as shown in FIG. 2A) is "patched" such that the HMD device 110a is removed. The patch image fills in the space covered by the HMD device and simulates the facial features and movements of the user (e.g., eyes, gaze, eyelid or eyebrow movements, etc.) that would otherwise be hidden by the HMD device 110a. In various embodiments, the patch image is based on a rendered 3D model of corresponding portions of the user's face and/or reflects in real time the facial movements and expressions of the user 105a. This allows a viewer to see a simulation of the entire face of the user e.g., similar to the face 210 illustrated in FIG. 2B.

Figure 3A:
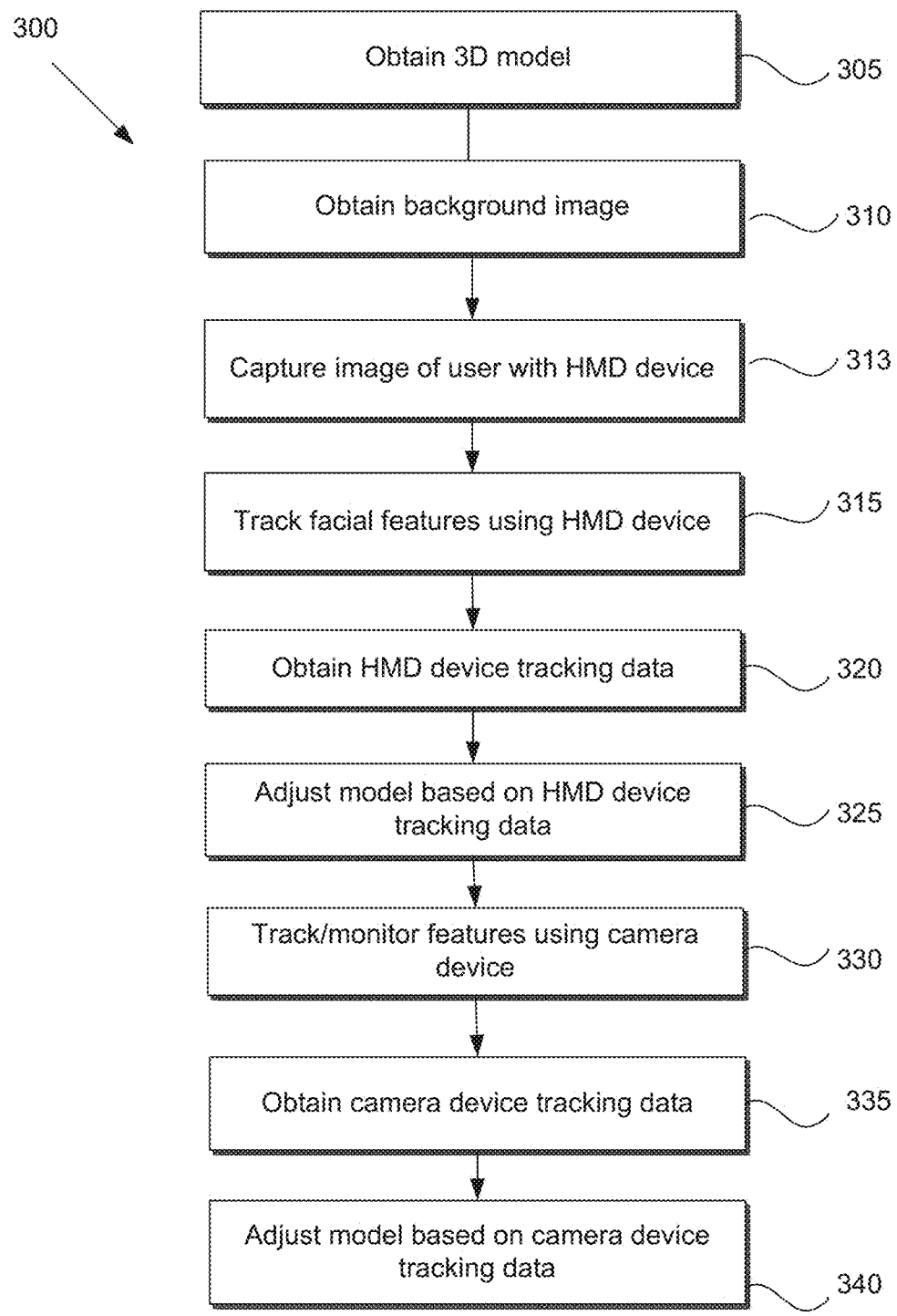
FIGS. 3A and 3B are flow charts illustrating an example method for managing the communication system illustrated in FIG. 1.
Figure 3B:
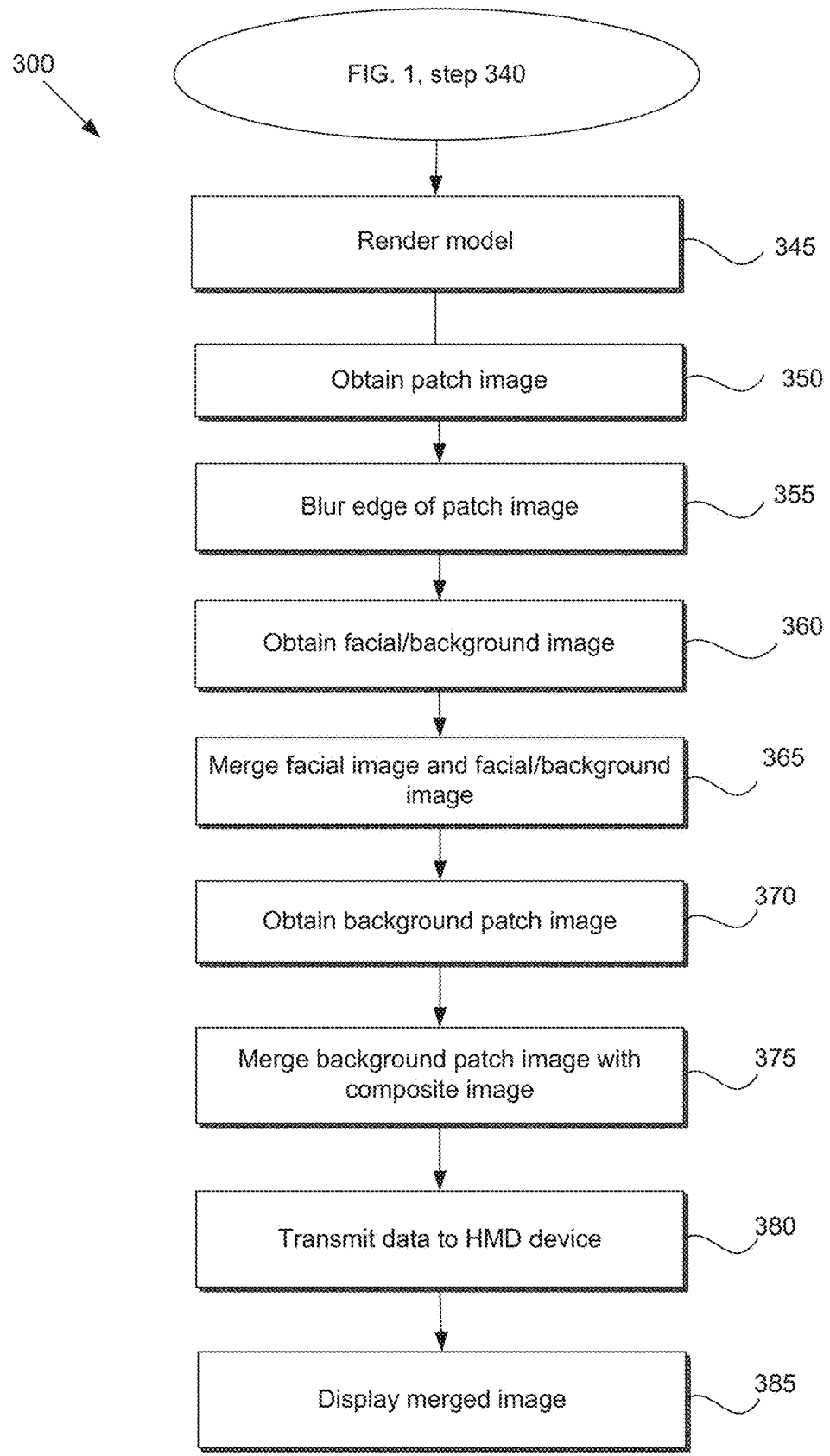

Referring next to FIGS. 3A and 3B, an exemplary method 300 for processing imagery for HMD device communication applications will be described. In this example, the method is performed primarily using the HMD device 110a, camera device 115a, user 105a and room 130a illustrated in FIG. 1. Although the method 300 describes various operations being performed by particular devices, it should be appreciated that any operation may instead be performed by any suitable device. By way of example, the method describes a camera device 115a that performs various image collection, generation and processing steps, but the same steps may also be performed by the HMD device 105a, the server 120, or another computing device (e.g., a smartphone, a television, a game console, a computer, etc.)

Figure 4:
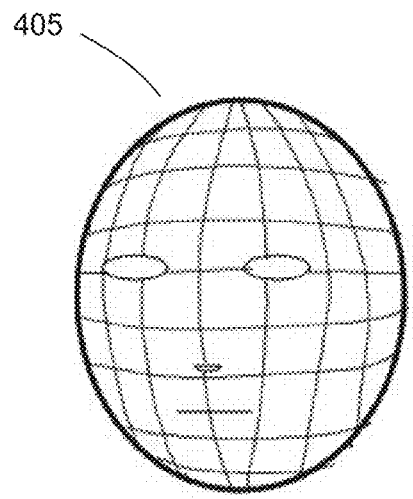
FIG. 4 is a diagram illustrating an example three dimensional model of the face of a user according to a particular embodiment of the present invention.

Initially, at step 305, a three dimensional (3D) model 405 of the face of the user 105a is obtained. Generally, the model 405 may be any software model, graphical model and/or mathematical/virtual representation of any part of the user 105a (e.g., the face, head, eyes, eyebrows, any part of the body, etc.) A simplified example is illustrated in FIG. 4. In this example, the 3D model indicates, shows and/or represents the head, face and various facial features of the user 105a (e.g., surface and shape of the head and face, eyes, nose, mouth, skin texture, color, light level, shading, etc.). In various implementations, the model is fully three dimensional (i.e., the model can be rotated or tilted in three dimensions) and/or may be modeled using multiple polygons, a mesh, vertices, edges, etc.

The software for the 3D model 405 may also be capable of automatically adjusting features in the model 405 based on input. By way of example, when input is received indicating that the lips should smile, other features in the 3D model 405 may also automatically move in response (e.g., there may be slight movements in the nose or in the area around the lips, etc.), thus simulating the many tiny movements that naturally occur in a human face when one part of the face changes or when a particular expression is desired. The 3D model 405 may simulate the entire face, head or body, or any portion of the head or body of the user 105a.

The 3D model 405 may be generated in any suitable manner using any known software or hardware. In various embodiments, the 3D model 405 is generated using a camera or any other suitable scanning device (e.g., camera device 115a, a 3D scanner, etc.) Generally, the scanning device is used to capture the face of the user when the user is not wearing the HMD device 110a (e.g., before step 313, when the user wears the HMD device 110a and steps in front of the camera device 115a to communicate with another user.) In other embodiments, the 3D model 405 is predefined. That is, the model 405 may be generic and/or may not be specifically tailored to or based on the actual face of the user 105a. Such a model is suitable for applications in which the user does not wish another user to see their real face, but perhaps only a face of a virtual reality avatar or character.

In the illustrated embodiment, the camera device 115a either generates the model 405 itself, or obtains the model 405 from an external source. For example, if another scanning device generated the model, the camera device may download the model data from the scanning device over a network (e.g., the network 125.) Alternatively, the model data may be transferred to the camera device 115a using any other suitable technique e.g., using a flash drive, etc. In this example method 300, the camera device 115a will later adjust and process the model 405, as will be described later in this application.

Returning to FIG. 3A, at step 310, the camera device 115a obtains a background image. A background image is any image of a background or environment, as seen from the perspective of a scanning or camera device (e.g., camera device 115a.) Generally, the background image captures a portion of the surrounding environment that will later be blocked from view when the user wears the HMD device 110a and steps in front of the camera device 115a to communicate with another user (e.g., as described in step 313.)

Figure 5A:
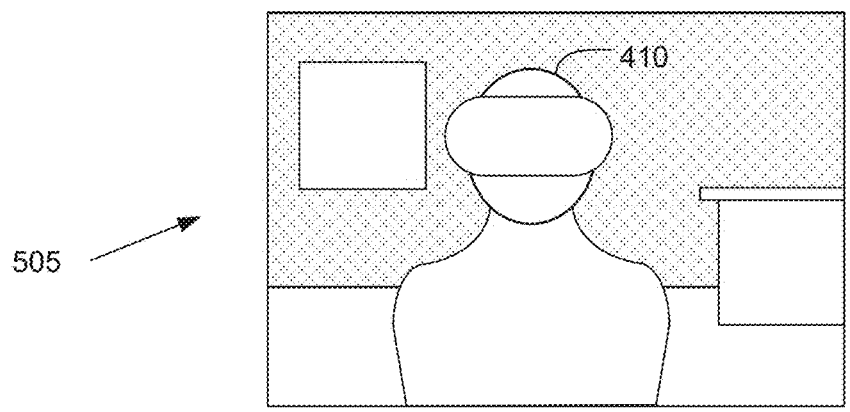
FIG. 5A is a diagram illustrating an example image of a user in a room according to a particular embodiment of the present invention.
Figure 5B:
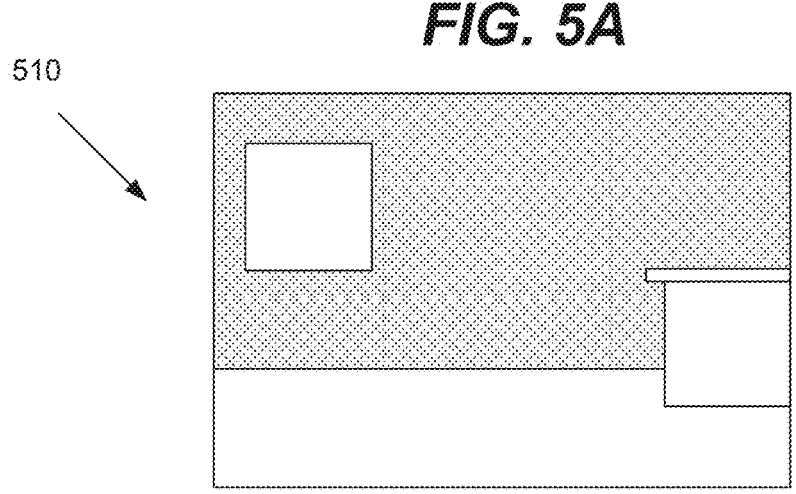
FIG. 5B is a diagram illustrating an example background image according to a particular embodiment of the present invention.

An example of a background image is illustrated in FIGS. 5A and 5B. FIG. 5A is an image 505 of the user 105a from the perspective of the camera device 115a. In this image 505, the user 105a is positioned in front of the camera device 110a and is using the HMD device 110a to communicate with another user 105b (e.g., as described in step 313 below.) The image 505 thus portrays the face 410 of the user, the HMD device 110a, parts of the user's body as well as portions of the background. In this example, the camera device 115a was used to capture the image 505. FIG. 5B is a background image 510 that is generally the same as the image illustrated in FIG. 5A (i.e., taken from the same perspective and by camera device 115a), except that the user 105a is absent from the image. In various embodiments, the background image 510 is taken before the image 505 was taken. The background image 510 captures at least a portion of the background that would otherwise be blocked from view by the user 105a in image 505. Such portions in the background image 510 can be used for various image processing steps (e.g., steps 370-375), as will be discussed later in this application.

The background image 510 may be generated in any suitable manner. In some embodiments, for example, the camera device 115a scans or captures one or more images of the background before the user enters into its field of view and blocks parts of the background. In still other embodiments, a camera/scanning device other than the camera device 115a captures the background. By way of example, if a particular camera/scanning device is properly positioned behind the user 105a when the user 105a is using the HMD device 110a and camera device 115a to participate in a video conference (e.g., step 313), the camera/scanning device can capture the background behind the user at any time. The camera can then transfer the resulting background image 510 to the camera device 115a for additional processing. The background image 510 may be stored in any suitable media/image format e.g., image files, video files, etc.

Returning to FIG. 3A, at step 313 the camera device 115a captures an image of the user 105a, who is now wearing the HMD device 110a and is using the device to communicate with another HMD device user 105b. The user 105a is situated in front of the camera device 115a, as illustrated in FIG. 6. In this particular embodiment, the camera device 115a is a video camera and is generating a live video feed of the user 105a and his or her surrounding background. The video feed is made of multiple individual images (e.g., video frames.) An example of such an image is image 505 of FIG. 5A, which was discussed above. Such images are hereinafter referred to as live images i.e., they are a photographic or photo-like visual recording of the user 105a and background, rather than a rendered, graphical model of the same. However, it should be appreciated that the camera device 115a may use any suitable type of video, camera, scanning, rendering and/or monitoring technology, and is not limited to generating the types of images and video described above.

To wear the HMD device 110a, the user 105a secures the HMD device 110a to his or her head. In this particular example, the HMD device 110a entirely covers the eyes of the user 105 and/or prevents any outside light, objects or images from being perceived by the user (although this is not a requirement and the HMD device may have a variety of different features and form factors.) The HMD device 110a includes a display unit that displays video, images and/or graphics to the wearer of the device 110a. As will be discussed below in greater detail, the HMD device 110a also includes one or more internal sensors and components that are used to gather information on the portions of the user's face that are covered by the HMD device 110a.

Afterward, at step 315, the HMD device 110a tracks particular facial features of the user 105a. Any facial feature that is covered by the HMD device 110a may be tracked. In some embodiments, for example, the tracked facial features or movements include but are not limited to gaze (e.g., eye rotation), eyelid movement and eyebrow movement. Any suitable software, hardware or sensors may be used inside the HMD device 110a to help track such features.

Figure 17:
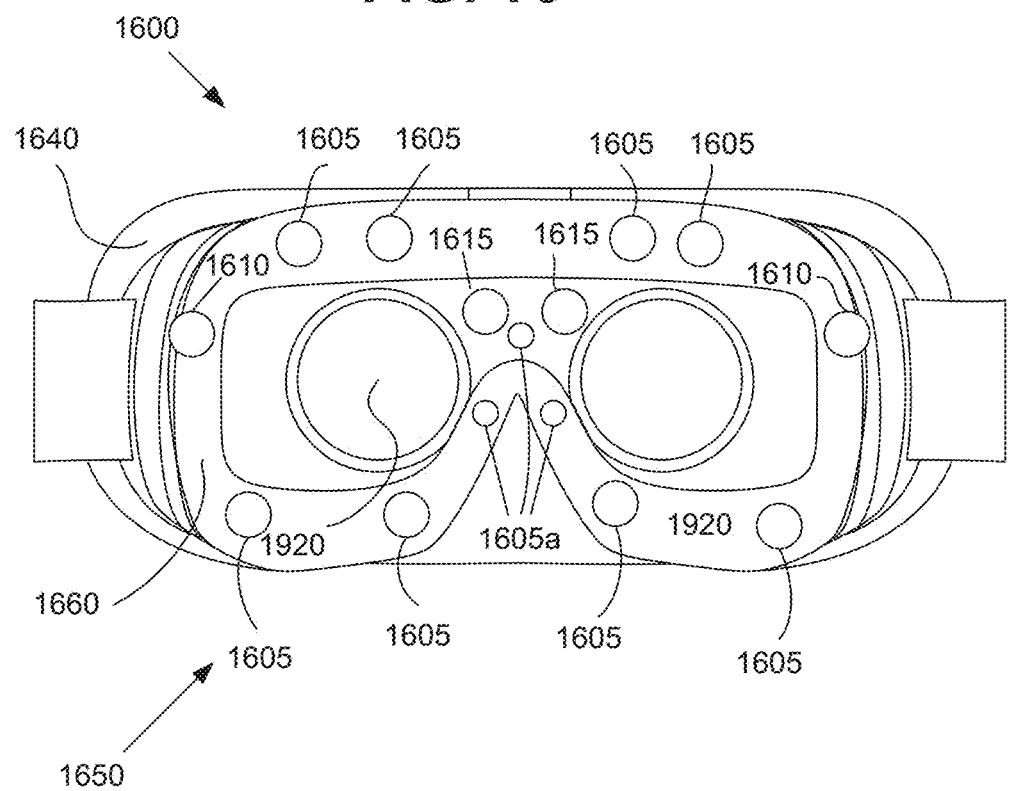

In the illustrated embodiment, the HMD device 110a is arranged to track gaze or eye rotation, as well as one or more facial movements (e.g., the movements of the upper and/or lower eyelids.) Such tracking may be performed using any known technology or technique (e.g., optical tracking, electrooculography etc.) In some approaches, the HMD device 110a includes one or more light sources and sensors (e.g., tracking cameras.) These devices are generally positioned on the interior of the HMD device 110a i.e., once the HMD device 110a is worn by the user, the sensors/cameras are hidden from view, have access to and are in close proximity to the portion of the face that is covered by the HMD device 110a. In this example, there are one or more tracking cameras that capture images of one or more facial features (e.g., eyelid, gaze, eye rotation, etc.). The images are later processed to determine the movement of the facial feature over time. In various embodiments, the HMD device also includes one or more light sources. These light sources are positioned on the interior of the HMD device and are arranged to project light at the eyes, eye region or other portions of the face covered by the HMD device. Each light source emits light that facilitates the tracking of the facial features (e.g., infrared light.) The light source(s) and camera(s) may be positioned in any suitable configuration on the HMD device 110a. (An example arrangement of IR light sources 1610 and tracking cameras 1615 in the HMD device 110a are illustrated in FIG. 17, which will be described in greater detail later in the application.)

The HMD device 110a may also use devices and sensors other than cameras to track facial movements and features. In some embodiments, for example, the HMD device 110a detects motion on portions of the face using a biometric sensor unit: e.g. electromyography (EMG), electrooculography (EOG). In the embodiment illustrated in FIG. 17, for example, an EMG sensor unit takes the form of a line of sensors 1605 that rests flush against the forehead, eyebrows and cheeks of the user when the user wears the HMD device 110a. Another example is that an EOG sensor unit takes the form of sensors 1605b that detects eye rotation and eyelid movement. In other implementations, the sensors may be arranged in any suitable configuration on the HMD device. The EMG sensor unit detects electrical impulses generated by muscle motion in the face of the user. These electrical impulses are stored and analyzed to determine the motion of a portion of the user's face (e.g., the movement of the eyebrows) over time. The EOG sensor unit measures electric potentials to detect eye movement via electrode probes.

Returning to FIG. 3A, at step 320, the camera device 115a obtains data relating to the above tracking (e.g., data generated using a camera tracking the gaze of the user, EMG/EOG sensor data, any data used to track any facial movements or feature covered by the HMD device, etc.). In the illustrated embodiment, the camera device 115a is coupled with the HMD device using a wired or wireless network. The HMD device 110a transmits the HMD device tracking data to the camera device 115a through the network.

The camera device 115a processes the data received from the HMD device 110a to determine what sort of facial movements or expressions are indicated by the data. In various embodiments, for example, the camera device 110a processes the images of various facial features (e.g., eye rotation, eyelids, etc.) that were captured over a period of time. The camera device then analyzes the images in order to determine how the facial features moved during that time period. Additionally, the camera device 115a analyzes EMG/EOG data received from the HMD device 110a to determine what types of movements (e.g., eyebrow movements) are indicated by the data.

The camera device 115a then adjusts the 3D model 405 based on the HMD device tracking data (step 325). That is, one or more selected facial movements/positions (e.g., changes in gaze, eye rotation, eyebrow movement/position, eyelid movement/position, etc.) detected in step 315 are used to adjust the 3D model 405. Generally, the 3D model 405 is adjusted to at least somewhat incorporate the facial changes, features or movements detected by the HMD device 110a. Thus, for example, if a movement in the eyebrow or eyelid of the user 105a was detected, the 3D model 405 is adjusted to simulate that movement. If a shift in the gaze of the user was detected, then the 3D model 405 is adjusted accordingly so that it substantially mirrors or copies the shift.

At step 330, the camera device 115a tracks various features related to the face of the user 105a or the surrounding environment. In some embodiments, for example, the camera device 115a measures or tracks the amount of ambient light (e.g, in the room 130a) using a light sensor. Additionally or alternatively, the camera device 115a detects the amount of light on a portion of the body or face of the user 105a. Any changes in this light level are recorded by the camera device 115a over time. Some implementations of the camera device 115a also track changes in the pose or orientation of the face/head of the user. The camera device 115a may also track any other facial feature or movement of the user (e.g., any facial movements or features in the portions of the face that are not covered by the HMD device 110a, such as the mouth, lips, cheeks, chin, etc.) In some approaches, the camera device tracks a feature, light or marker on the HMD device (e.g., light emitting device 1605 in FIG. 16) to help determine changes in the pose of the face/head of the user 105a.

It should be appreciated that there may be multiple camera and/or light sensing devices that gather the above tracking/lighting data. The camera/light sensing devices may be distributed in various places in the room 130a and monitor the user 105a and the ambient environment from different angles. In that case, these other camera/light sensing devices are coupled to the camera device 115a through a network and the camera device obtains the tracking/lighting data from the other camera/light sensing devices through the network (step 335), so that the camera device 115a can further process the data. In some designs, a light sensing device/sensor is on the HMD device 110a. In various applications, the HMD device 110a obtains the light sensor data and transmits it to the camera device 115a for further processing and analysis.

Of course, if the camera device 115a is the only device that generates tracking/light sensing data, the camera device 115a can obtain the data without requiring any transfer of the data through a network. In still other embodiments, the camera device 115a is replaced by an image processing device (e.g., the image processing device 2000 of FIG. 20, the server 120 of FIG. 1, etc.), which does not itself capture images using a camera and/or sense ambient light levels, but instead obtains tracking/lighting/sensor data from one or more camera/light sensing devices/sensors positioned in the room 130a and processes the obtained data (e.g., as described in steps 320, 325, 335-380 of FIGS. 3A and 3B.)

Once the camera device 115a obtains the above tracking/lighting data, the 3D model 405 is adjusted based on the data (step 340). In various implementations, the camera device 115a analyzes the collected tracking/lighting data e.g., multiple images of the face of the user. The camera device 115a performs image processing to determine what kinds of facial movements are indicated in the images. Based on the analysis and image processing, the camera device adjusts the model 405. Generally, the model 405 is adjusted to simulate one or more changes that were sensed, detected or tracked in step 330. By way of example, if the light level changed, a tone on the surface of the model 405 may be changed to reflect the difference in the light level. If the position or orientation of the head or the user 105*a* shifted, then that shift would be reflected in the model 405 as well. If the shape or position of particular facial features changed (e.g., a movement of the lips, cheeks, etc.), then the model 406 id adjusted based on the detected change.

The aforementioned tracking may be performed in a variety of ways, depending on the needs of a particular application. In various implementations, for example, the camera device 115*a* is arranged to track changes in the pose or orientation of the head or face using one or more feature points. Any known technology or technique may be used to perform such tracking. An example of one approach is shown in FIGS. 7A and 7B. FIG. 7A is a diagram representing an image 410 of the actual face of the user 105*a* (e.g., as shown in image 505 of FIG. 5A.) The camera device 115*a* captured the image while it was pointed at the user, who at the time was wearing the HMD device 110*a* and was using it to communicate (e.g., as previously described in connection with FIG. 6 and step 313.) The location of the HMD device 110*a* is shown by the dotted line region. In this simplified example, the camera device 115*a* selects two feature points 705*a* and 710*a*. The feature points may be on any portion of the face of the user. In various implementations, the feature points are chosen such that they are readily identifiable due to their proximity to particular facial features e.g., such as the ends of the mouth, the tip of the nose, etc.

FIG. 7B is a diagram representing the 3D model 405 of the face (e.g., the 3D model obtained in step 305 of FIG. 3A.) The camera device 115*a* identifies one or more feature points 705*b* and 710*b* in the model 405 that correspond to the feature points 705*a* and 710*a* selected in the facial image 410. The camera device 115*a* then compares the positions of the feature points 705*a*/710*a* in the facial image 410 to those of the feature points 705*b*/710*b* in the model 405. In this particular example, there is a difference between the two sets of feature points, since the head depicted in the 3D model 405, unlike the head in the image 410, is oriented more to one side, rather than looking straight ahead.

In various embodiments, the camera device 115*a* then computes a difference or error between the position of the feature point(s) 705*a*/710*a* identified in the facial image 410 and the position of the feature point(s) 705*b*/710*b* identified in the model 405 (FIG. 7B.) Based on the difference/error, the camera device 115*a* then adjusts the model 405. In the illustrated embodiment, the difference in the relative positions of the feature points reveal that the orientation of the model 405 is slightly incorrect. The model 405 is then adjusted or reoriented so that the difference is reduced. This adjustment helps cause the model 405 to orient itself properly i.e., so that the orientation of the model 405 better resembles that of the facial image 410.

A somewhat similar technique can be applied to lighting. FIG. 8 and FIG. 7B illustrate one example approach involving light detection/sensing. FIG. 8 illustrates an image 505 of a user 105*a*, which is captured by the camera device 115*a* (e.g., as described in step 313.) The camera device 115*a* identifies a region 810*a* on the face of the user 105*a* in the image. The camera device 110*a* determines an approximate light level at that region 810*a*.

The camera device 115*a* identifies a corresponding region 810*b* on the face of the model 405 illustrated in FIG. 7B. That is, the region 810*b* is in the same general location on the modeled face as the region 810*a* on the face in the image 505. The camera device 115*a* estimates the light level or tone simulated at the region on the model 405. The light levels of the regions 810*a* and 810*b* are compared and/or a difference or error between them is determined. Based on the difference in light levels, the model 405 is adjusted. Generally, the model is adjusted so that the difference is reduced and the light level simulated on the face of the model 405 is more similar to the light level on the face in the image 505.

Returning to FIGS. 3A and 3B, once the model has been adjusted as described in steps 325 and 340, the model 405 is rendered (step 345 of FIG. 3B.) That is, in various embodiments, the model 405, which was stored and adjusted in a software application, is rendered to generate a three dimensional graphical model 905 that resembles the actual face of the user 105*a*. A simplified example is illustrated in FIGS. 9A and 9B. FIG. 9A is a diagram representing a live image 410 of the actual face of the user 105*a*, as captured by the camera device 115*a* (e.g., as described in step 313 of FIG. 3A.) The camera device captured the image while the user was wearing an HMD device and using it to communicate with another user (e.g., as described in connection with FIG. 6.)

Thus, in FIG. 9A, much of the face of the user 105*a* is covered with the HMD device 110*a*. FIG. 9B represents an image of the corresponding rendered model 905, which due to the real time adjustments made in steps 325 and 340, closely resembles the actual face of the user 105*a* in the image 410 in terms of pose, orientation and light levels. In contrast to the actual face of the user 105*a* as seen by the camera device 115*a* in image 410 or 505, the face of the rendered model 905 is not covered with an HMD device 110*a*. Additionally, due in part to adjustments made to the model in step 325, the facial features (e.g., eyes, eyebrows, eyebrow position, eyelids, gaze, eye rotation, etc.) of the user 105*a* which are hidden in image 410 (FIG. 9A) by the HMD device 110*a* are simulated in the rendered model 905 of FIG. 9B.

In this particular application, it is intended that the live image 410 of the actual face of the user 105*a* and its background will be transmitted to another user 105*b* to facilitate real time communication. Thus, the other user 105*b* will be able to see the face of the user 105*a* while they are communicating. As previously discussed, one challenge of that approach, however, is that the HMD device 110*a* covers a large portion of the face of the user 105*a*, thus making the real time communication less engaging and personal.

To address this issue, the camera device 115*a* obtains a patch image (step 350). In various embodiments, a patch image is an image from a model (e.g., rendered model 905) that is combined with or merged with another image (e.g., live image 410 or 805) to form a composite image. Put another way, the image 410/505 of the user 105*a* wearing the HMD device 110*a* is "patched" such that the HMD device 110*a* is removed and a rendered image is put in its place. The rendered image includes one or more facial features (e.g., eyes, eyelids, eyebrows, part of the nose, etc.) that underlie the HMD device. In this example, this allows another user 105*b* who is communicating with the user 105*a* to see at least representations of the eyes and eyebrows of that user, which makes the conversation more natural and engaging. Additionally, those facial features, although simulated, will track and imitate in real time the movements of corresponding features of the actual user 105a.

Figure 10:
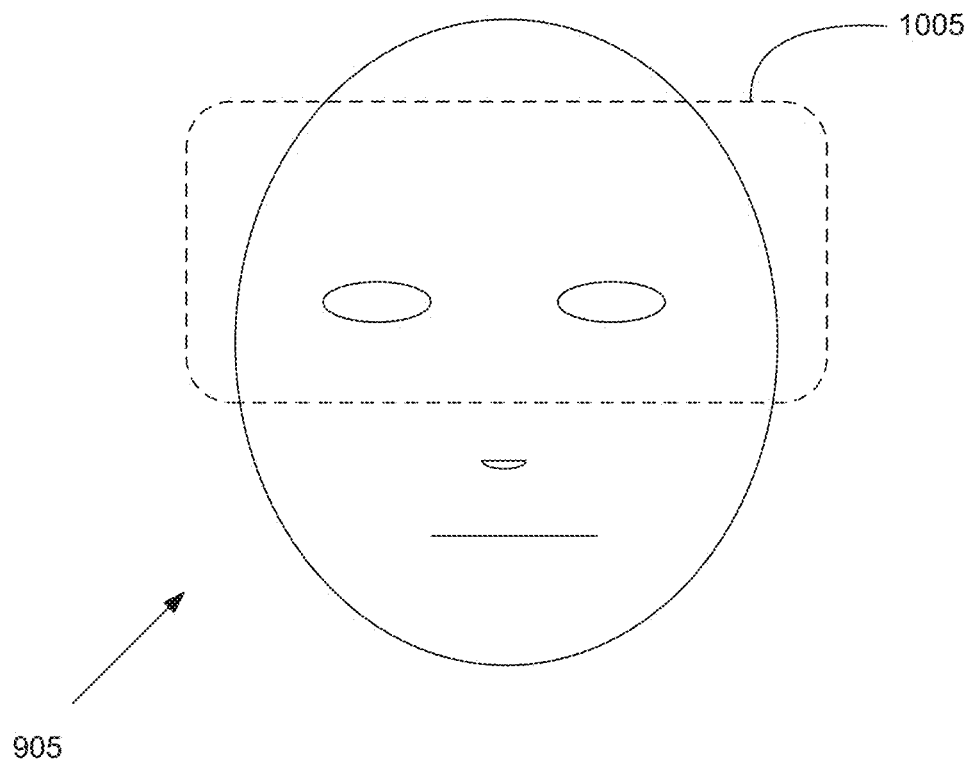
FIG. 10 is a diagram illustrating a technique for identifying a region for a patch image in a model according to a particular embodiment of the present invention.

One example approach for generating a patch image is illustrated in FIG. 10. FIG. 10 illustrates the rendered 3D model 905 of the head of the user. The model 905 has been adjusted based on tracking/lighting data obtained by the camera device 115a (e.g., as discussed in steps 315-450 of FIG. 3A). The camera device 115a identifies a region 1005 of the 3D model that corresponds to the HMD device 110a, as seen in the image 410/505 (e.g., FIG. 5A) of the user 105a, which shows the actual face of the user as seen by the camera device 115a. The region 1005 is illustrated in FIG. 10 as a square region made of dotted lines. In this example, the region 1005 is generally the same size, shape and/or in the same position relative to the face of the user 105a as the HMD device 110a in the image 410/505 of the user 105a. Accordingly, in this example, the region 1005 has a rectangular shape, which resembles the shape of the HMD device 110a in live image 410 (FIG. 9A).

Figure 11:
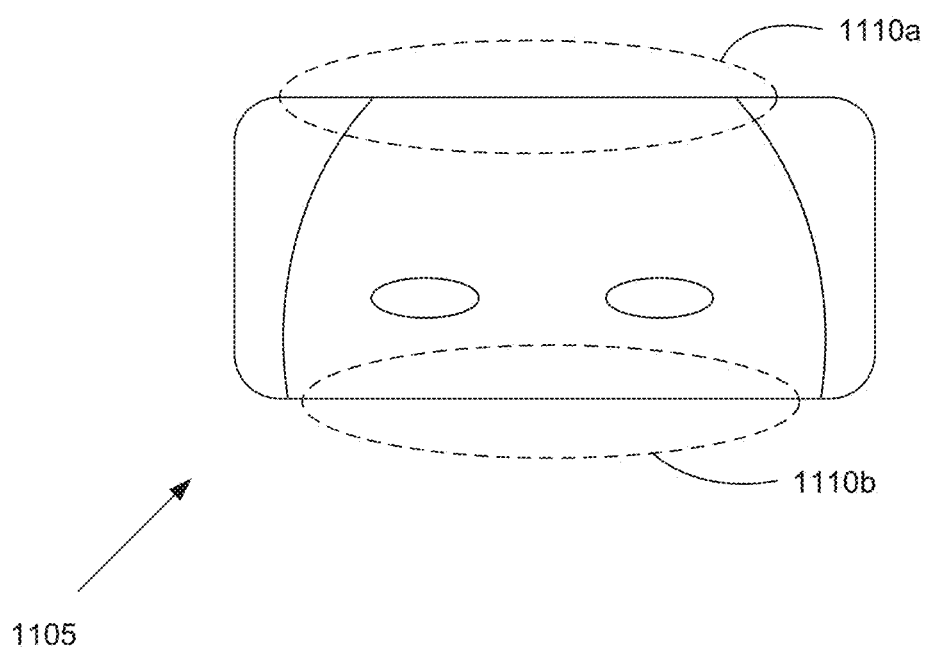
FIG. 11 is a diagram illustrating a patch image according to a particular embodiment of the present invention.

Afterward, the portion of the rendered 3D image 905 that falls into the region 1005 is extracted, copied or generated from the rendered 3D model 905. This step is illustrated in FIG. 11. In FIG. 11, only the portion of the rendered model 905 that is within the boundaries of the region 1005 remains. Other portions of the rendered 3D model 905 have been removed. The extracted portion of the rendered model 905 is a patch image 1105.

Returning to FIG. 3B, at step 355, one or more edges of the patch image 1105 is blurred or softened. That is, the camera device 115a analyzes the patch image 1105, the live image 410/805 and/or the rendered model 905 to determine locations or edges on the patch image that will later merge into another object (e.g., the face of the user 105a.) The camera device 115a then blurs, dilates and/or softens those edges using any suitable image processing technique.

In the illustrated embodiment of FIG. 11, for example, an analysis of the live image 410/805 and/or the patch image 1105 reveals that if the patch image 1105 is merged into the live image 410/805 such that it replaces the HMD device 110a, the top and bottom edges of the patch image 1105 will merge into the face of the user 105a, as seen in the live image 410/805. To make the merging of the patch image 1105 and the face in the image 410/505 more seamless, the top and bottom edges of the patch image 1105 are thus dilated or blurred to soften the edges (as marked by dotted line regions 1110a and 1110b.) Any suitable compositing technique may be used to blue or soften the edges of the patch image. On the other hand, the same analysis also reveals that the left and right edges of the patch image will not be merging into the face of the user 105a in the live image 410/805 and instead will mix only with the background. Thus, in this example those edges are not dilated or blurred.

Figure 12:
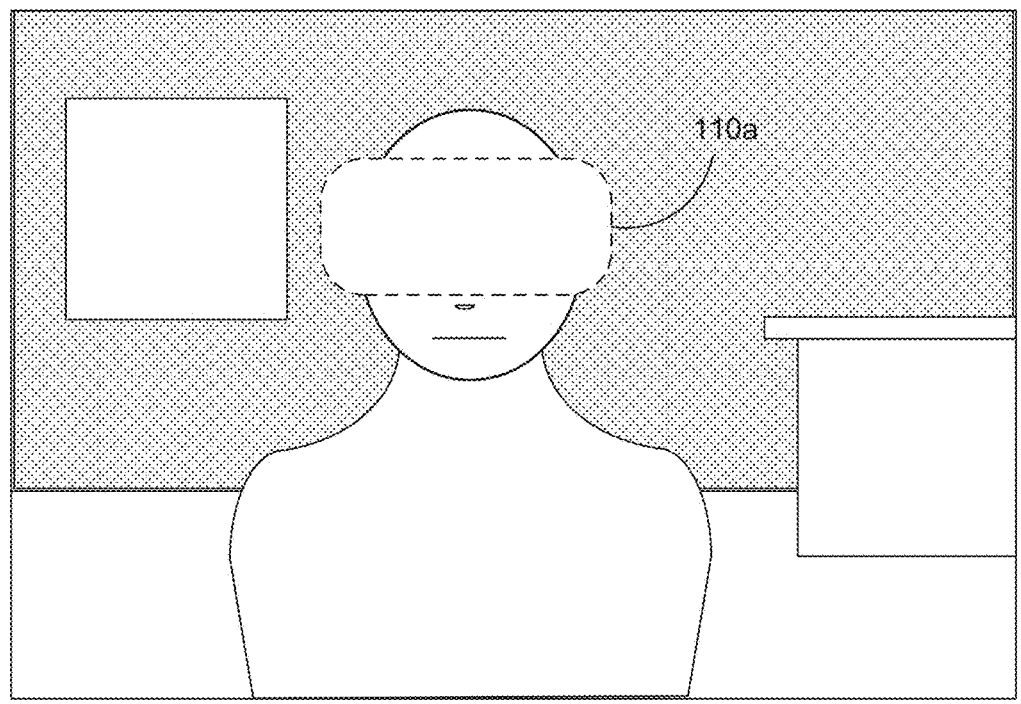
FIG. 12 is a diagram illustrating a region for a patch image in a facial/background image according to a particular embodiment of the present invention.

Returning to the method of FIG. 3B, at step 360, the camera device 115a obtains a facial/background image. In this example, the facial/background image is the image taken by a camera/scanning device (e.g., camera device 115a) that captures an image of the face of a user wearing the HMD device. The facial/background image may also capture a wide variety of other parts of the body of the user and/or a surrounding background. An example of a facial/background image 1205 is the image 505 illustrated in FIGS. 5A and 12. As previously described, the image 505 was taken by the camera device 115a in step 313 of FIG. 3A. In this example, the facial/background image 1205 is a live image i.e., a video frame of a video that includes live footage of the user. In other embodiments, however, the facial/background image may include a wide variety of elements (e.g., only the face or part of the face of the user, no background, etc.) and/or use a different type of media or image (e.g., a photographic image, a rendered image or model, etc.) In the illustrated embodiment, the user 105a is standing in a room 130a with a colored wall and various types of furniture in the background. The user 105a is wearing the HMD device 110a.

Figure 13:
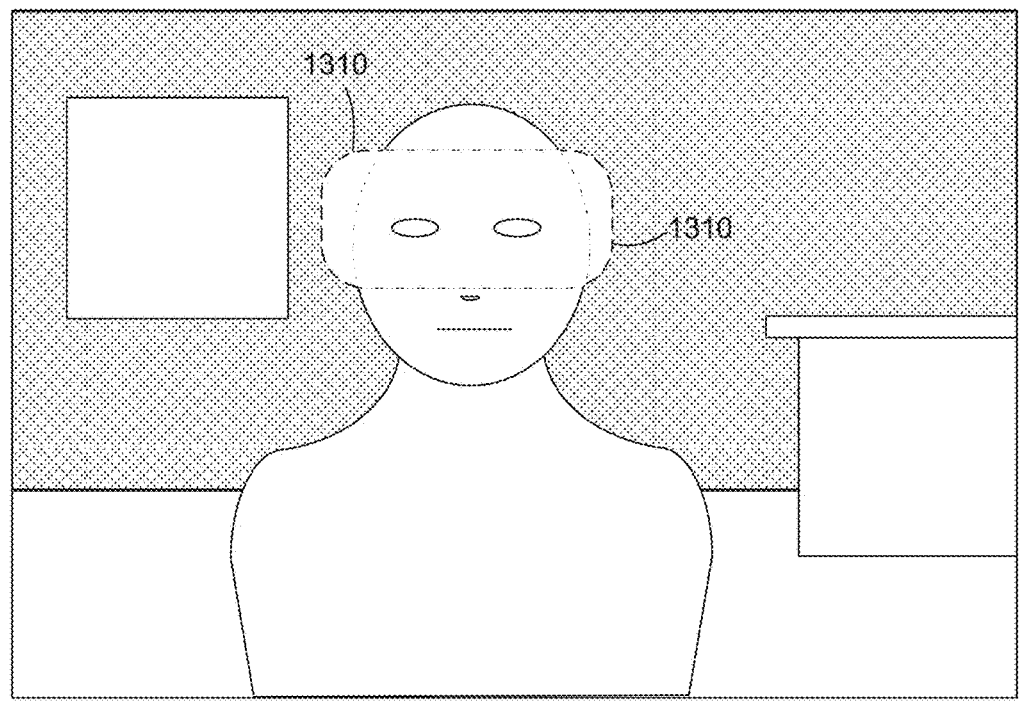
FIG. 13 is a diagram illustrating a merging of a patch image and a facial/background image according to a particular embodiment of the present invention.

At step 365, the patch image 1105 and the facial/background image 1205 are merged. In some embodiments, the patch image 1105 is superimposed over or replaces a region of the facial/background image 1205 that includes the HMD device 110a. Alternatively, a portion of the facial/background image 1205 containing the HMD device 110a is removed and the patch image 1105 is inserted, blended and/or merged into the facial/background image 1205 into the same position that the HMD device 110a previously occupied. An example of this merging process is illustrated in FIG. 13, in which the patch image 1105 has taken the place of the HMD device 110a illustrated in FIG. 12. The merging of the facial/background image 1205 and the patch image 1105 results in a composite image 1305. Any suitable type of image processing technique, including processes not described above, may be performed to make the new composite image.

In some but not necessarily all situations, additional adjustment of the composite image 1305 is desirable. For example, in the illustrated embodiment, a review of the composite image 1305 in FIG. 13 reveals a problem. The patch image 1205 in many respects follows the contours of the shape of the removed HMD device 110a, and thus tightly fits into the space that the HMD device 110a used to occupy. However, there are regions in the facial/background image 1205 that are not yet properly filled in. These are non-facial regions 1310 that were previously covered by the HMD device 110a and that make up parts of the background. In the example illustrated in FIG. 13, these regions 1310 are on either side of the head of the user 105a, although depending on how the head and HMD device 110a are oriented, in some cases only one region may be visible.

To help address this issue, at step 370, a background patch image is obtained. To do this, the camera device 115a analyzes the background image 510 obtained in step 310. This background image 510, which is illustrated FIG. 5, is an image of the background without the presence of the user 105a. Generally, the background image 510 covers at least some of the same parts of the background that were shown in the facial/background image 1205, as well as parts of the background that are hidden or covered in image 1205 by the user 105a and/or the HMD device 110a. Thus, the background image 510 contains the information that is needed to fill in the non-facial regions 1310 i.e., the color or texture of the background that would lie behind the non-facial regions which were covered by the HMD device 110a in the facial/background image 1205.

Figure 14:
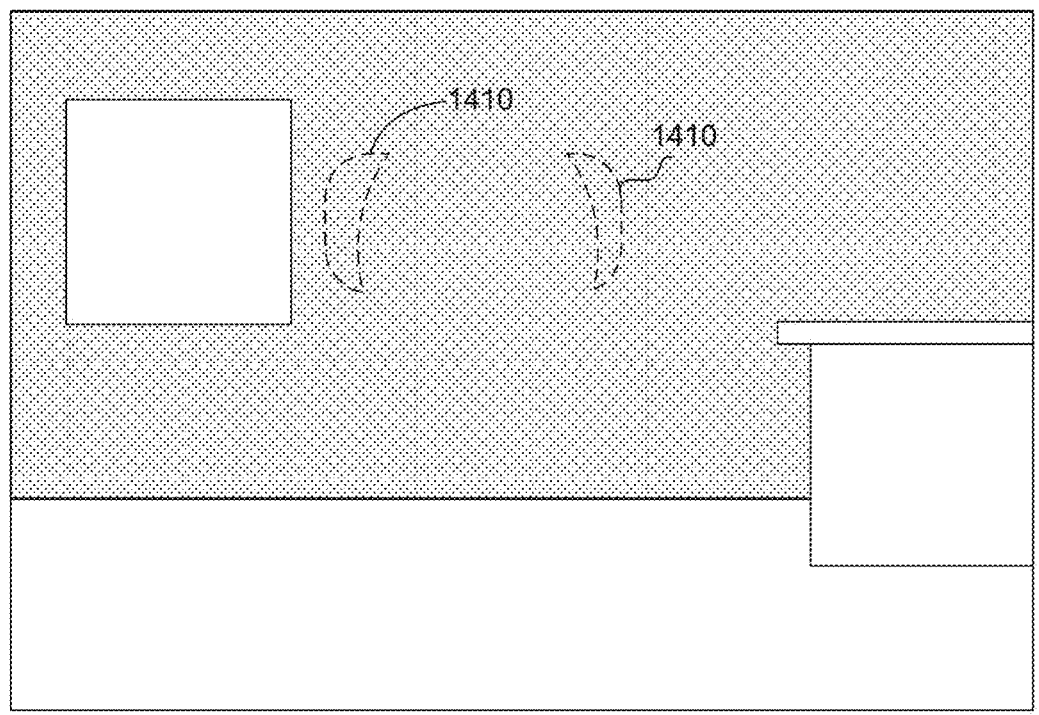
FIG. 14 is a diagram illustrating a technique for identifying regions in a background image according to a particular embodiment of the present invention.

The camera device 115a determines regions in the background image 510 that correspond to the non-facial regions 1310 (e.g., have the same approximate position, are in the same general location and/or display the same part of the background.) An example of this determination is illustrated by regions 1410 in FIG. 14. Based on the above determination and analysis of the background image 510, the camera device 115a generates a suitable background patch image 1415. The background patch image 1415 includes/simulates the colors, shading, appearance and/or textures of the identified regions 1410 in the background image 505.

Figure 15:
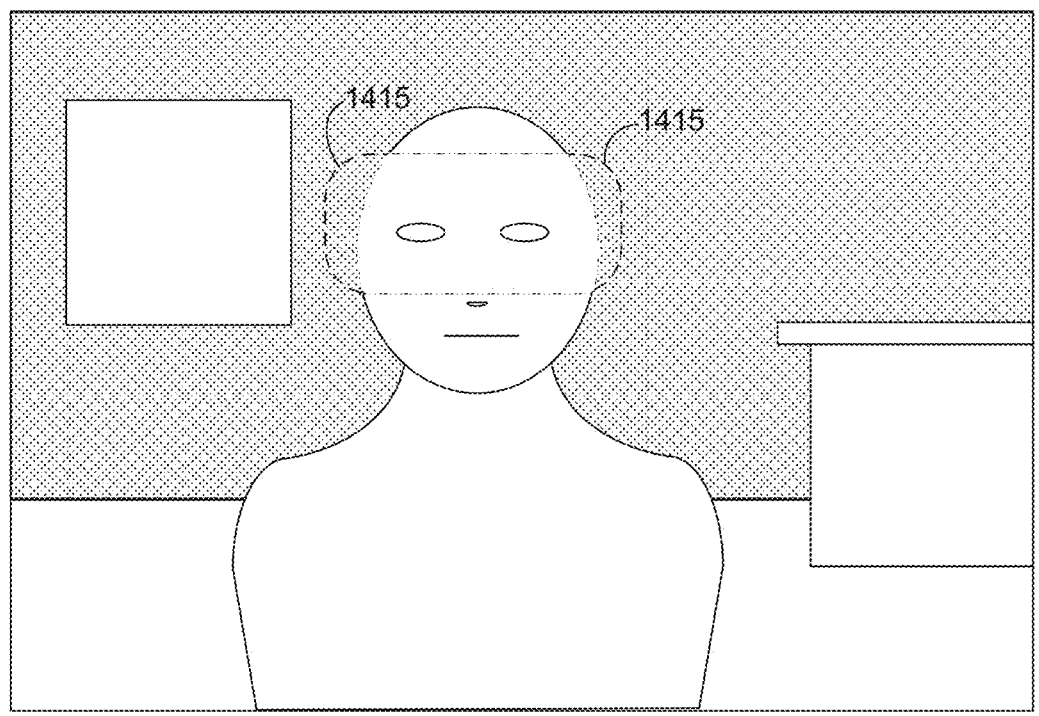
FIG. 15 is a diagram illustrating a technique for merging a background patch image into a facial/background image according to a particular embodiment of the present invention.

At step 375, the background patch image(s) and the composite image 1305 are combined or merged. An example of this is illustrated in FIG. 15. The non-facial regions have now been filled in with background patch image(s) 1415. The background patch image(s) 1415 may be images pre-generated using the regions 1410 in the background image 505, which are then merged with the composite image 1305. In some embodiments, the camera device 115a fills in or paints the regions 1310 in composite image 1305 with one or more colors, texture and/or shading such that they resemble regions 1410 in the background image 505.

As a result of the above steps of method 300, a live image (e.g., image 505/1205) of a user 105a wearing an HMD device 110a has been adjusted to remove the HMD device. In place of the HMD device, simulated eyes and other portions of the face have been provided using a patch image 1105. In various embodiments, the steps of the method 300 in FIGS. 3A and 3B are repeated for each video frame of a live video feed of the user 105a. That is, for each video frame, facial features are tracked (e.g., steps 315 and 330), a model is adjusted (e.g., steps 325 and 340), a patch image is obtained (e.g., step 350), and the patch image is merged into a facial/background image to form a composite image. In some designs, each composite image is an adjusted video frame of a live video stream in which the HMD device has been removed and replaced with a suitable patch image.

Returning to the method 300 of FIG. 3B, the camera device 115a transmits the composite image data (e.g., video data made of many of the aforementioned composite image video frames) to a recipient HMD device 110b, which is being worn and used by another user 105b of FIG. 1 (step 380). The recipient HMD device 110b receives the composite image data over the network 125 and renders the received composite image data. Over time, as the user 105b receives multiple such composite images, the user will be able to view the changing facial expressions of the user 105a in real time. In various embodiments, the user 105b will even be able to view expressive, moving, simulated eyes and eye regions, even though at that time the person generating those expressions has his or her eyes covered with an HMD device.

In various implementations, the steps of the method 300 are performed by two or more HMD devices (e.g., HMD devices 110a and 110b) concurrently. That is, camera device 115a obtains a facial/background image 505/1205 of the user 105a (e.g., step 313), the facial features of the user 105a are tracked (e.g., steps 315 and 330), a patch image 1105 is generated (e.g., step 350), the patch image 1105 is merged into the facial/background image 1205 and the resulting composite image 1305 is sent to user 105b for rendering at the HMD device 110b. Similarly and concurrently, camera device 115b obtains a facial/background image of the user 105b, the facial features of the user 105b are tracked, a patch image is generated, the patch image is merged into the facial/background image and the resulting composite image is sent to user 105a for rendering at the HMD device 110a and viewing by the user 105a. The tracking, generation and transmission of the composite images occur in real time. Even though each user is wearing an HMD device, the user can see simulated eyes and other facial features of the other user. These simulated facial features follow the actual facial movements of the corresponding user in real time, thus creating a significantly more engaging, interactive and personal communication experience.

Some of the embodiments described above relate to a system in which two users with two HMD devices are communicating with one another. However, it should be appreciated that the system is not limited to such applications. By way of example, most or almost all of the operations illustrated in FIGS. 3A and 3B may be applied to a system in which there is only one user 105a who uses an HMD device 110a and/or a camera device 115a (FIG. 1). Steps 305-375 are performed as described above. Steps 380 and 385 may also be performed, except the composite image is not necessarily transmitted to another user 105b or HMD device 110b. Instead, the composite image is provided to or transmitted over a network to any suitable receiving device e.g., a television, a smart phone, a tablet, any suitable computing device or display device, etc. In various embodiments, the receiving device is arranged to display the composite image. In some approaches, the composite image(s) are received in real time, although this is not a requirement and the composite image(s) may be received at any time. That is, the composite image(s) may be generated for any suitable purpose or device, and are not limited to being displayed at another HMD device or for communication applications.

Figure 16:
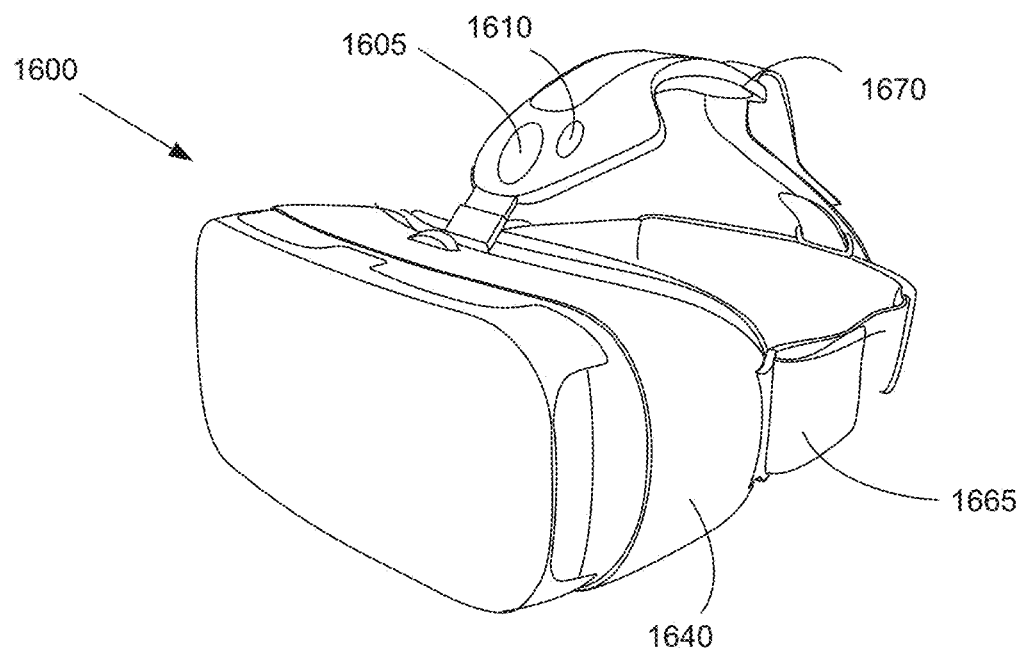
FIGS. 16, 17 and 18 are diagrams illustrating perspective, back and front views of an HMD device according to a particular embodiment of the present invention.
Figure 18:
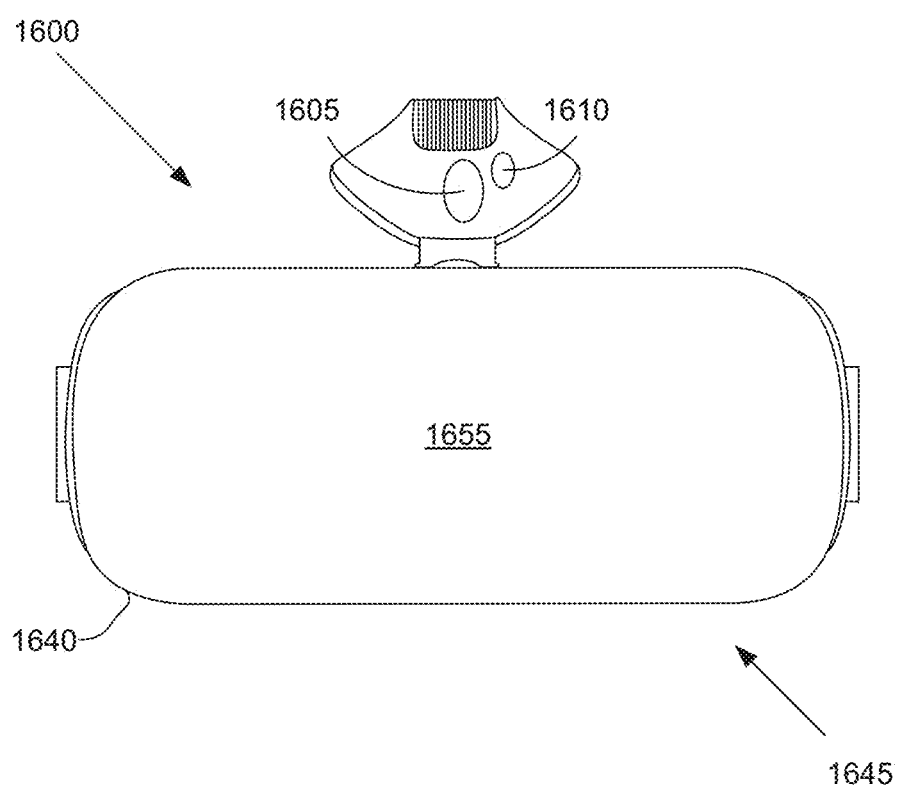
Figure 19:
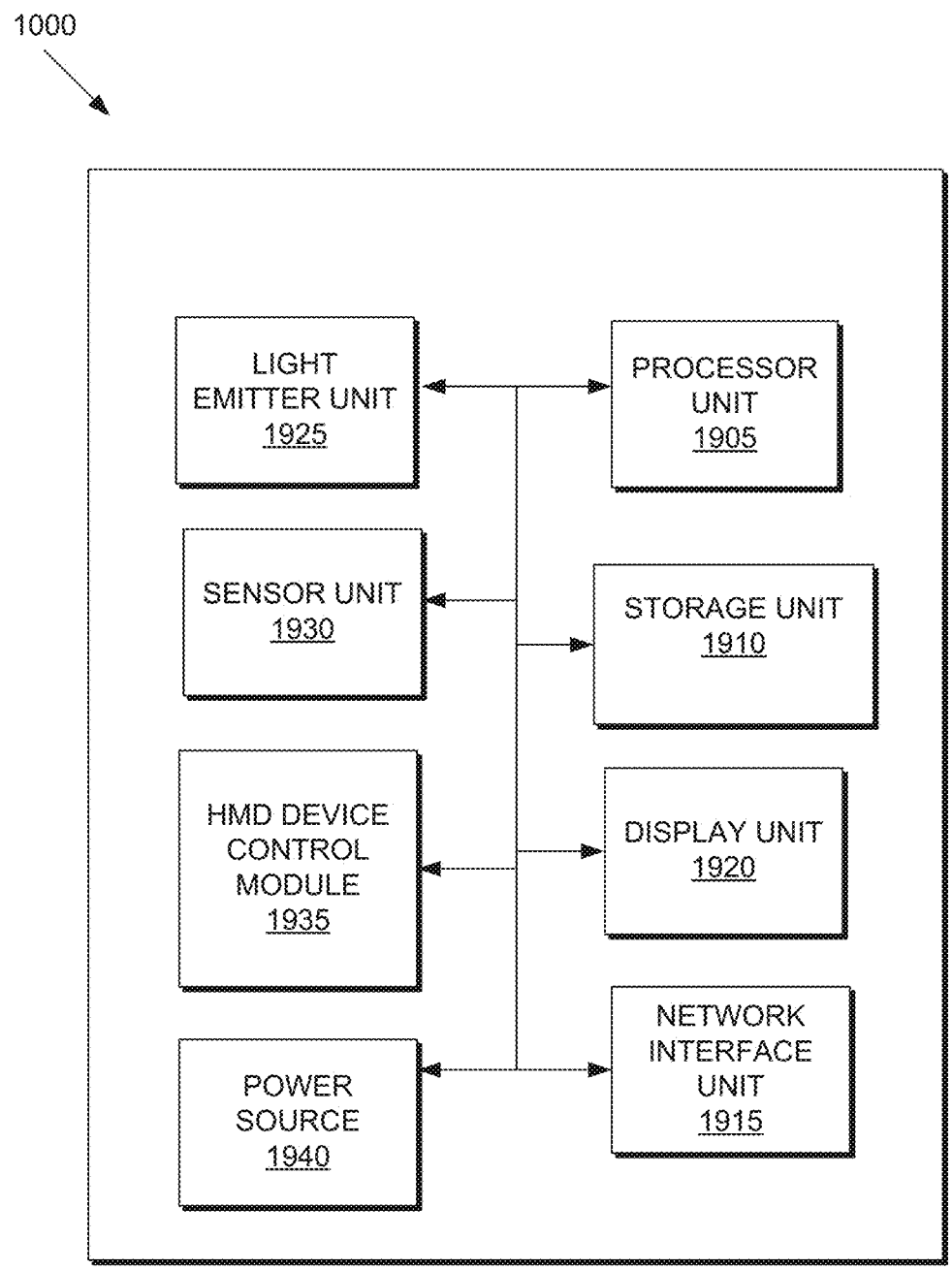
FIG. 19 is a block diagram of a HMD device according to a particular embodiment of the present invention.

Referring next to FIG. 16-19, a head mounted display (HMD) device 1600 according to a particular embodiment of the present invention will be described. The HMD device 1600 may be any suitable head mounted display device (e.g., the HMD device 110a of FIG. 1). Perspective, back and front views of an example HMD device 1600 are illustrated in FIGS. 16-18. FIG. 19 is a diagram illustrating various components of the HMD device 1600. The HMD device 1600 includes a processor unit 1905, which includes one or more processors, a storage unit 1910, a display unit 1920, a network interface unit 1915, a light emitter unit 1925, a sensor unit 1930, an HMD device control module 1935 and a power source 1940. In various implementations, the processor unit 1905 is not used or is not (primarily) responsible for the processing of images or other operations described below. Instead, any data/images to be processed is transferred to a remote device and the processing is performed by the remote device (e.g., the server 120, a game console, the camera device 115a, a television, any suitable computing device, etc.)

The light emitter unit 1925 includes one or more light emitting devices. Any suitable type of light emitting device or light emitting technology may be used (e.g., an infrared light, an LED light) and each light emitting device may be positioned on any surface or part of the HMD device 1600. In various embodiments, for example, a light emitting device is positioned on the exterior of the HMD device 1600, as illustrated by device 1605 in FIGS. 16 and 18. The light emitting device 1605 emits a light that is used as a marker by the camera device 115a when the HMD device 1600 is worn by a user in front of the camera device 115a. That is, the camera device 115a uses the emitted light to help track the movement, orientation and/or pose of the face of the user 105a (e.g., as described in connection with step 330 of FIG. 3A.)

The interior of the HMD device 1600 may also include a light emitting device. In various designs, for example, there is one or more infrared light emitting devices positioned in the back or interior of the HMD device 1600. One example location for the infrared light is illustrated in FIG. 17, which shows the interior or rear of the HMD device 1600 i.e., the side of the HMD device that, when worn, is positioned over the eyes and flush against the face of the user. One or more light sources 1610 (e.g., infrared light sources) are positioned on the HMD device 1600 and arranged to illuminate the eyes of the user when the user wears the HMD device

1600. The infrared light sources assist in the tracking of particular facial features (e.g., gaze, eyelids, etc.)

The sensor unit 1930 includes one or more sensors that are arranged to help track facial movements of a user who is wearing the HMD device. Any suitable sensor technology may be used, including but not limited to tracking cameras, pressure sensors, temperature sensors, mechanical sensors, motion sensors, light sensors and electrical sensors. In various embodiments, for example, there are one or more electromyography (EMG) and electrooculography (EOG) sensors positioned on the interior/back side of the HMD device. An example set of EMG sensors 1605 and EOG sensors is illustrated in FIG. 17. In this example, the EMG sensors 1605 and the EOG sensors 1605a are situated on or within a cushion on the HMD device 1600. When the HMD device 1600 is worn, the cushion and the sensors 1605 are pressed flush against the eyebrows of the user. When the eyebrows move, the sensors 1605 detect the electrical impulses generated by the muscle movement. The HMD device 1600 then transmits this sensor data to the camera device 115a for processing, as described in steps 315, 320 and 325 of FIG. 3A. Such EMG sensors may be arranged to detect motion in other parts of the face of a user as well.

There may also be one or more light sensors mounted on the HMD device 1600. One such example is illustrated in FIGS. 16 and 18. As shown in the figures, a light sensor 1610 is mounted on an exterior surface of the HMD device 1600. The light sensor 1610 is arranged to detect a level of ambient light around the HMD device 1600. The HMD device 1600 is arranged to transmit the light sensor data to an image processing device (e.g., camera device 115a or server 120 of FIG. 1) using the network interface unit 1915, so that the data can be used to help determine how a tone or light level in a 3D model 405 should be adjusted (e.g., as described in step 340).

The sensor unit 1930 may also include one or more cameras or other tracking devices that are arranged to track the movement of facial features that are covered by the HMD device 1600. In some embodiments, for example, the sensor unit 1930 includes one or more cameras that are arranged to track gaze, eye rotation, eyelid movement and/or other facial features that underlie the HMD device 1600 when the device is worn by a user. An example arrangement of such tracking devices (e.g., tracking cameras 1615) are shown in FIG. 17.

The display unit 1920 is any hardware or software used to display images, video or graphics to a user of the HMD device 1600. An example position for the display unit is illustrated in FIG. 17. In the illustrated embodiment, when the user wears the HMD device 1600, the display unit 1920 is positioned directly over the eyes of the user. The display unit 1920 can use any suitable display and/or projection technology to show images to the user. In various embodiments, the display unit 1920 is arranged to provide the user with a virtual reality experience. That is, the HMD device 1600 completely covers the eyes of the user, therefore removing the user's ability to see his physical surroundings. Once the display unit 1920 is activated, the only thing the user is able to see are the graphics and images that the display unit 1920 generates. This can give the user the impression that he or she is an entirely different, virtual environment. In some designs, when the user turns his or her head, sensors in the HMD device 1600 detect the motion and cause the images to shift to give an impression that the user is actually physically in the simulated environment and can explore it just as the user would any real, physical environment (i.e., by turning one's head, peering around a corner, looking up and down an object, etc.) The display unit 1620 is further arranged to display the face of another HMD device user in real time, with (partially) simulated facial expressions, as described in step 385 of FIG. 3B. Any known virtual reality display technology may be used in the display unit 1920.

The power source 1940 includes any suitable hardware or software used to store energy or electrical power. The stored energy is used to power other components and operations of the HMD device 1600. Any suitable energy storage mechanism may be used. In some embodiments, for example, the power source is a battery. In other embodiments, the HMD device 1600 is powered through a wired connection to an external power source.

The network interface unit 1915 includes any hardware or software suitable for enabling the HMD device 1600 to communicate with other devices (e.g., the camera device 115a, the server 120, another HMD device, etc.) over a network (e.g., a local network, network 125 of FIG. 1, a wireless or wired network, etc.) In some embodiments, the network interface unit 1915 is arranged to transmit tracking and sensor data to the camera device 115a for processing (e.g., steps 320 and 335 of FIG. 3A.) The network interface unit 1915 is also arranged to receive images and image data over the network 125 from another camera device and/or HMD device (e.g., step 385 of FIG. 3B.) The network interface unit 1012 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The storage unit 1910 includes any hardware or software suitable for storing data or executable computer code. The storage unit 1910 can include but is not limited to a hard drive, flash drive, non-volatile memory, volatile memory or any other type of computer readable storage medium. Any operation or method for the HMD device (e.g., HMD device 110a/110b of FIG. 1) that is described in this application (e.g., step 315 of FIG. 3A, step 385 of FIG. 3B, etc.) may be stored in the form of executable computer code or instructions in the storage unit 1910. The execution of the computer code or instructions by the processor unit 1905 causes the device 1600 to perform any of the aforementioned operations or methods.

The HMD device control module 1935 is any hardware or software arranged to perform any of the operations or methods (e.g., step 315 of FIG. 3A, step 385 of FIG. 3B, etc.) described in this application that pertain to the HMD device (e.g., HMD device 110a/110b of FIG. 1.) In various embodiments, the HMD device control module 1935 is arranged to cause the device 1600 to track facial features, render and display images received from another HMD device/camera device (e.g., steps 315 and 385).

The HMD device 1600 may have a wide variety of different form factors, sizes, dimensions and configurations. One particular example implementation is shown in the FIGS. 16-18. In the illustrated embodiment, for example, the HMD device 1600 includes a body 1640 with a frontside 1645 and a backside 1650. The body 1640 includes some or all of the electrical and computer components described above and shown in FIG. 19. The frontside 1645 of the body 1640 is illustrated in FIG. 18 and includes a frontal plate 1655. When the HMD device 1600 is worn by a user, the frontal plate 1655 and body 1640 completely cover and hide the eyes of the user. In various embodiments, the frontal plate 1655 and body 1640 thus entirely prevent any ambient light from reaching the eyes of the user. As a result, the HMD device 1600 is able to entirely control what the user sees.

The backside 1650 of the HMD device 1600, which is illustrated in FIG. 17, is designed to be placed flush against the face and over the eyes of the user. In the illustrated embodiment, the backside 1650 of the HMD device 1600 includes a cushion 1660 that surrounds or borders the display unit 1920. As previously discussed, the cushion may include various biometric sensors (e.g., EMG sensors 1605, EOG 1605a, etc.) and is designed to be pressed flush against the forehead or other portions of the face of the user when the HMD device 1600 is worn.

The HMD device 1600 may also include various structures or mechanisms for firmly securing the HMD device 1600 to the face of a user. In the illustrated embodiment, for example, when a user wears the HMD device 1600, the device is secured to the face with a side strap 1665 that goes around the head, as illustrated in FIG. 16. Another central strap 1670 extends from the top of the body 1640 of the HMD device 1600 over the top of the head. In this particular embodiment, one or more light emitting devices 1605 are mounted on a portion of this central strap. Such devices emit light that a camera device 115a can use to track the position of the head of the user. Additionally or alternatively, such devices may be placed in any suitable location on a surface of the HMD device 1600.

Figure 20:
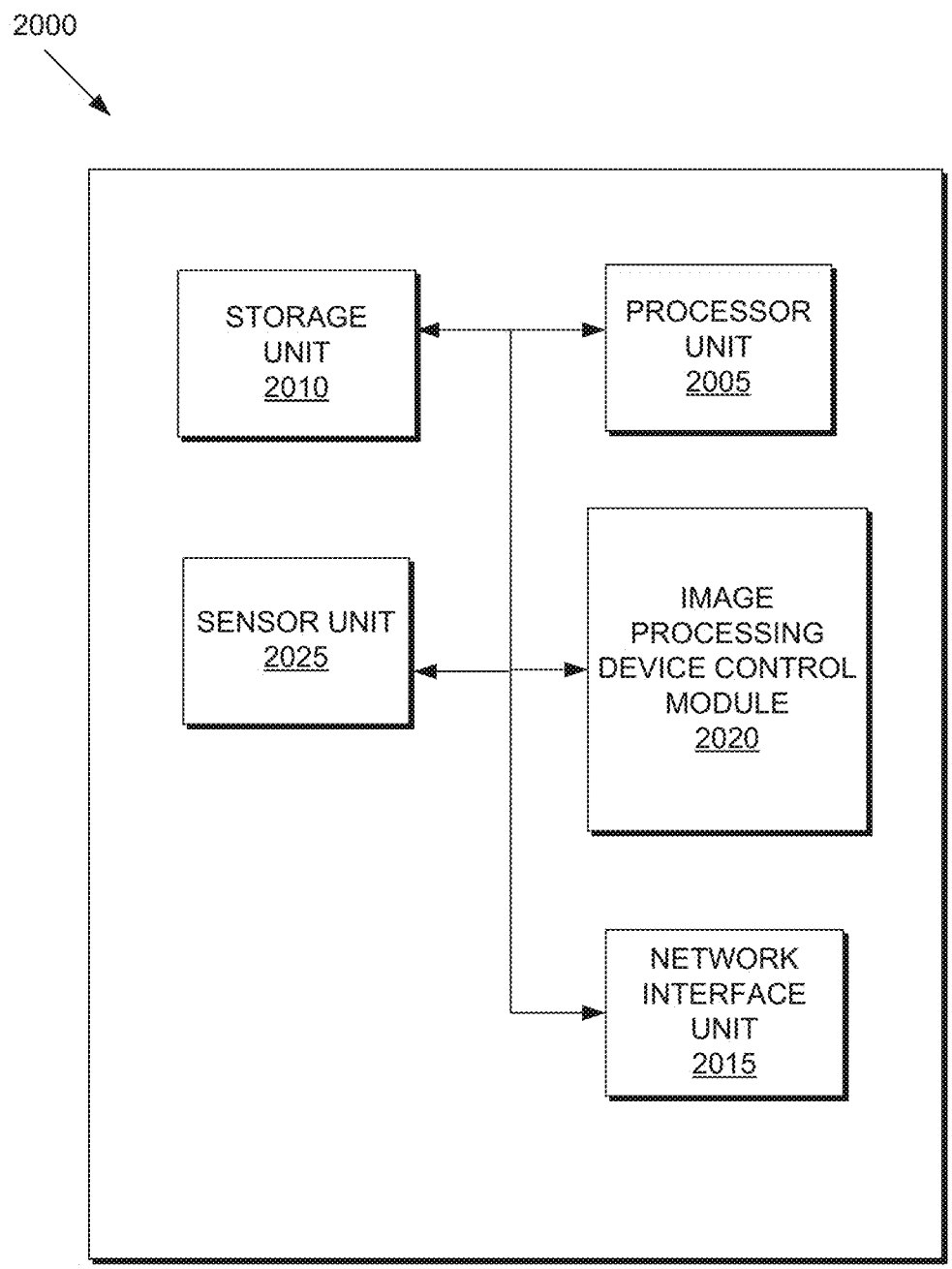
FIG. 20 is a block diagram of an image processing device according to a particular embodiment of the present invention.

Referring next to FIG. 20, an imaging processing device 2000 according to a particular embodiment of the present invention will be described. In various embodiments, the imaging processing device 2000 is a camera device (e.g., the camera device 115a of FIGS. 1 and 6), although the imaging processing device 2000 may also be any suitable device arranged to collect, generate, process and transmit images as described in the method 300 of FIGS. 3A and 3B. That is, the imaging processing device 2000 may be any device that is arranged to perform some or all of the operations performed by the camera device 115a in the aforementioned method. Accordingly, in some embodiments, the imaging processing device 2000 is a camera device, a game console, a server (e.g., the server 120 of FIG. 1), a computer, a smartphone a television and/or any other suitable computing device. The imaging processing device 2000 includes a processor unit 2005 that includes one or more processors, a storage unit 2010, an image processing device control module 2020, an optional sensor unit 2025 and a network interface unit 2015.

The network interface unit 2015 includes any hardware or software suitable for enabling the imaging processing device 2000 to communicate with the HMD device (e.g., HMD device 110a/1600), the server 120 or other devices over a network as appropriate. In some embodiments, the network interface unit 2015 is arranged to obtain a 3D model 405, a background image 510, HMD device tracking data, camera/light sensor tracking data or other types of data from external sources (e.g., steps 305, 310, 320 and 335 of FIG. 3A.) The network interface unit 2015 is also arranged to transmit image data to an HMD device 110a/110b/1600 over a network, so that the image data can be rendered and seen by a user of the HMD device (e.g., step 380 of FIG. 3B.) The network interface unit 2015 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The storage unit 2010 is any hardware or suitable for storing data or executable computer code. The storage unit 2010 can include but is not limited to a hard drive, flash drive, non-volatile memory, volatile memory or any other type of computer readable storage medium. Any operation or method for the camera device (e.g., camera device 115a of FIG. 1) that is described in this application (e.g., steps 305-310, steps 320-385 of FIGS. 3A and 3B) may be stored in the form of executable computer code or instructions in the storage unit 2010. The execution of the computer code or instructions by the processor unit 2005 causes the device 2000 to perform any of the aforementioned operations or methods.

The image processing device control module 2020 is any hardware or software arranged to perform any of the operations or methods (e.g., steps 305-310, steps 320-385 of FIGS. 3A and 3B) described in this application that pertain to the camera device 115a. In various embodiments, the image processing device control module 2020 is arranged to cause the device to obtain a 3D model, a background image, HMD device and/or camera device tracking data, render a model, obtain a patch image, merge the patch image and a facial/background image, merge the resulting composite image with a background patch and transmit the composite image (e.g., steps 305-380 of FIGS. 3A and 3B.)

The sensor unit 2025 is an optional unit that is included if the image processing device 2000 is, for example, a camera/monitoring device (e.g., the camera device 115a of FIG. 1.) The sensor unit 2025 includes any hardware or software arranged to help track or monitor facial features of a user who wearing an HMD device. In various embodiments, for example, the sensor unit 2025 includes one or more cameras that are arranged to track a light emitted by a device on the HMD device. In still other embodiments, the camera(s) are used to track the general orientation or pose of the head of a user and/or particular features on the face of the user (e.g., the position of the lips.) Some implementations of the sensor unit 2025 include one or more light sensors arranged to track the ambient light level, or the light level on a nearby object or user (e.g., as described in connection with step 330 of FIG. 3A.) The image processing device 2000 then analyzes the images and sensor data and processes them (e.g., as described in steps 330, 335 and 340 of FIG. 3A.)

Any of the methods or operations described herein can be stored in a tangible computer readable medium in the form of executable software code. The code can then be executed by one or more processors. The execution of the code causes a corresponding device (e.g., an image processing device 2000, a server 120, a camera device 115a, an HMD device 110a/1600, etc.) to perform the described operations.

The above methods and arrangements relate to the generation of a patch image. In some of the examples described above, the patch image corresponds to only a portion of the face of a user. However, in various implementations, the patch image corresponds to other parts of the face or body, or can correspond to or indicate any part of the body or a portion of any object or image.

The above methods and arrangements also describe techniques for merging a patch image and a facial/background image. In some of the aforementioned examples, the facial/background image is an image captured using a (video) camera e.g., each facial/background image is a video frame of a video taken of the user who is wearing an HMD device. The patch image is based on a rendered model of at least a portion of the head or face of the user. The patch image and the facial/background image are merged, forming a composite image that is partially or mostly a video frame. A portion of the composite image is the patch image, which is a pre-rendered model of a portion of the face of the user and is not a photograph or video of the user. It should be appreciated, however, that the patch image and the facial/ background image may be based on a wide variety of different types of media and formats. For example, in some embodiments, the facial/background image is not a frame of a live video feed, but instead is also a rendered three-dimensional model (which in turn may have been generated based on a video or a three dimensional scan of a user and/or his or her surroundings.) The techniques described herein can be used to merge a patch image (e.g., a rendered model of a user's eyes or eye region) with the facial/background image (e.g., a rendered model of at least other portions of the user's face or head.)

In some of the aforementioned examples, an HMD device is described that covers the eyes of a user. A facial/background image is taken that captures the user, and a patch image is merged into the facial/background image. This merger replaces the HMD device in the image with simulated facial features. However, it should be appreciated that the techniques of this application may also be applied to any process in which one image is "patched" with another, and is not necessarily limited only to the specific examples of patch images and HMD devices described above. By way of example, in some implementations, the HMD device does not completely cover the eyes of a user and/or may cover other parts of the face or body of a user. The patching techniques described herein may be used to generate one or more patch images based on sensors in the HMD device that track features underlying the HMD device. Based on such sensor data, a patch image may be generated and merged with a facial/background image of the user and the HMD device (e.g., generally as described in the steps of method 300 of FIGS. 3A and 3B.)

Although only a few embodiments of the invention have been described in detail, it should be appreciated that the invention may be implemented in many other forms without departing from the spirit or scope of the invention. For example, the present application and figures describe various methods (e.g., methods of FIGS. 3A and 3B) that perform particular operations. It should be appreciated that in some embodiments, one or more of these operations/steps may be modified, reordered and/or deleted. Additionally, some figures, such as FIGS. 1 and 16-20, describe devices that contain various components. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. Therefore, the present embodiments should be considered illustrative and not restrictive and the invention is not to be limited to the details given herein.

What is claimed is:

1. A head mounted display (HMD) device, comprising:
one or more biometric sensors, the biometric sensors including electrooculography (EOG) sensors, arranged to, while the HMD is being worn by a user, track at least one of a plurality of facial features of a facial portion of the user covered by the HMD device, wherein the one or more biometric sensors are arranged on an interior surface facing the facial portion of the user, wherein the plurality of facial features comprise an eye gaze; and
a network interface unit arranged to transmit the tracked facial feature causing generation of a composite image, wherein:

the composite image of the user is based on merging a patch image with a first image and a second image,
the first image includes the user wearing the HMD device,
the second image indicates an environment surrounding the user,
the patch image is based on a 3-D model of at least the facial portion of the user,
the patch image is dilated or blurred at locations or edges that merge with the first image and the patch image is not dilated or blurred at locations or edges that merge with the second image, and
the 3-D model has been adjusted based on the tracked at least one facial feature of the facial portion covered by the HMD and tracked by the one or more biometric sensors.

2. The HMD device of claim 1 further comprising:
a device body arranged to cover the facial portion of the user when the HMD device is worn by the user; and
wherein the one or more biometric sensors are positioned on the device body.

3. The HMD device of claim 2 further comprising:
a display positioned on the device body that is arranged to display an image when the HMD device is worn by the user.

4. The HMD device of claim 1 wherein the 3-D model is generated based on scanning of a face of the user.

5. The HMD device of claim 1 wherein the tracked at least one facial feature indicates one or more facial movements of the user.

6. The HMD device of claim 1 wherein the composite image is one of a plurality of video frames of a live video feed of the user.

7. The HMD device of claim 1 wherein the generation of the composite image is performed in real time.

8. The HMD device of claim 1 wherein the 3-D model is based on a first set of tracking data, wherein the adjusted 3-D model is rendered, and wherein at least a portion of the rendered 3-D model is used to help generate the patch image.

9. A system comprising:
a body configured to secure the system to a user;
one or more biometric sensors, including EOG sensors, arranged on an interior surface of the body, facing a facial portion of the user;
one or more processors configured to:
track, via the one or more biometric sensors, at least one of a plurality of facial features of a facial portion of the user covered by the body, wherein the plurality of facial features comprise an eye gaze,
transmit the tracked at least one facial feature; and
generate a composite image, wherein:
the composite image of the user is based on merging a patch image with a first image and a second image,
the first image includes the user wearing the body,
the second image indicates an environment surrounding the user,
the patch image is based on a 3-D model of at least the facial portion of the user,
the patch image is dilated or blurred at locations or edges that merge with the first image and the patch image is not dilated or blurred at locations or edges that merge with the second image, and
the 3-D model has been adjusted based on the tracked at least one facial feature of the facial portion covered by the body and tracked by the one or more biometric sensors.

10. The system of claim 9, further comprising a display configured to display an image on a display positioned on the body when the body is worn by the user.

11. The system of claim 9, wherein the one or more processors is configured to generate the 3-D model based on scanning a face of the user.

12. The system of claim 9, further comprising a network interface configured to transmit the tracked at least one facial feature indicates one or more facial movements of the user.

13. The system of claim 9, wherein the one or more processors is configured to generate the composite image, wherein the composite image is one of a plurality of video frames of a live video feed of the user.

14. The system of claim 9, wherein the one or more processors is configured to generate the composite image in real time.

15. The system of claim 9, wherein the one or more processors is configured to generate the 3-D model based on a first set of tracking data, wherein the adjusted 3-D model is rendered, and wherein at least a portion of the rendered 3-D model is used to help generate the patch image.

16. A device comprising:
a display;
one or more biometric sensors, including EOG sensors, arranged on an interior surface of a device body arranged to cover a facial portion of a user when the device is worn by the user;
one or more processors configured to:
track, via the one or more biometric sensors, at least one of a plurality of facial features of a facial portion of the user of the device, wherein the facial portion of the user corresponds to an area covered by the display, wherein the plurality of facial features comprise an eye gaze,
transmit the tracked at least one facial feature; and
generate a composite image, wherein:
the composite image of the user is based on merging a patch image with a first image and a second image,
the first image includes the user wearing the device body,
the second image indicates an environment surrounding the user,
the patch image is based on a 3-D model of at least the facial portion of the user,
the patch image is dilated or blurred at locations or edges that merge with the first image and the patch image is not dilated or blurred at locations or edges that merge with the second image, and
the 3-D model has been adjusted based on the tracked at least one facial feature of the facial portion covered by the device body and tracked by the one or more biometric sensors.

17. The device of claim 16, wherein the one or more processors is configured to generate the 3-D model based on scanning of a face of the user.

18. The device of claim 16, wherein the one or more processors is configured to track the at least one facial feature, wherein the tracked at least one facial feature indicated one or more facial movements of the user.

* * * * *